(12) United States Patent
Egashira et al.

(10) Patent No.: US 11,014,073 B2
(45) Date of Patent: May 25, 2021

(54) CLUSTER SUPPORTED CATALYST AND METHOD FOR PRODUCING SAME

(71) Applicants: TOYOTA JIDOSHA KABUSHIKI KAISHA, Toyota (JP); GENESIS RESEARCH INSTITUTE, INC., Nagoya (JP)

(72) Inventors: Kazuhiro Egashira, Nagoya (JP); Yoshihiro Takeda, Nagoya (JP); Namiki Toyama, Nagoya (JP); Toshiaki Tanaka, Nagoya (JP); Seitoku Ito, Nagoya (JP); Masahiko Ichihashi, Nagoya (JP)

(73) Assignees: TOYOTA JIDOSHA KABUSHIKI KAISHA, Toyota (JP); GENESIS RESEARCH INSTITUTE, INC., Nagoya (JP)

( * ) Notice: Subject to any disclaimer, the term of this patent is extended or adjusted under 35 U.S.C. 154(b) by 0 days.

(21) Appl. No.: 16/018,497

(22) Filed: Jun. 26, 2018

(65) Prior Publication Data

US 2018/0369789 A1 Dec. 27, 2018

(30) Foreign Application Priority Data

Jun. 27, 2017 (JP) .............................. JP2017-125582

(51) Int. Cl.
*B01J 29/06* (2006.01)
*B01J 23/72* (2006.01)
(Continued)

(52) U.S. Cl.
CPC .............. *B01J 23/72* (2013.01); *B01J 23/40* (2013.01); *B01J 23/42* (2013.01); *B01J 23/745* (2013.01); *B01J 29/061* (2013.01); *B01J 29/068* (2013.01); *B01J 29/072* (2013.01); *B01J 29/076* (2013.01); *B01J 29/08* (2013.01); *B01J 29/106* (2013.01); *B01J 29/12* (2013.01); *B01J 29/126* (2013.01); *B01J 29/14* (2013.01); *B01J 29/146* (2013.01); *B01J 29/16* (2013.01); *B01J 29/166* (2013.01); *B01J 29/40* (2013.01); *B01J 29/405* (2013.01); *B01J 29/44* (2013.01); *B01J 29/46* (2013.01); *B01J 29/48* (2013.01); *B01J 29/60* (2013.01); *B01J 29/605* (2013.01); *B01J 29/62* (2013.01); *B01J 29/64* (2013.01); *B01J 35/0006* (2013.01); *B01J 35/006* (2013.01);
(Continued)

(58) Field of Classification Search
CPC ...... B01J 29/061; B01J 29/068; B01J 29/072; B01J 29/076; B01J 29/08; B01J 29/60; B01J 29/605; B01J 29/62; B01J 29/64; B01J 29/40; B01J 29/405; B01J 29/106; B01J 29/126; B01J 29/146; B01J 29/12; B01J 29/14; B01J 29/16; B01J 29/166; B01J 29/48; B01J 29/44; B01J 29/46; B01J 2229/16; B01J 2229/186; B01J 2229/37; B01J 35/0006; B01J 35/0073; B01J 37/349; B01J 37/346; B01J 37/0209; B01J 37/16; B01J 37/0213; B01J 37/0211; B01J 37/0203; B01J 23/745; B01J 23/40; B01J 23/42; B01J 23/72; B01J 23/74; B01J 23/16; B01J 23/26; B01J 23/28; B01J 23/30; B01J 23/36; B01J 23/44; B01J 23/46; B01J 23/34; B01J 23/50; B01J 23/462; B01J 35/006; F01N 3/101; F01N 3/0857; B01D 53/92; B01D 53/94; B01D 53/945; B01D 53/944; B01D 53/9418; B01D 2255/50; B01D 2255/502; B01D 2255/504; B01D 53/38; B01D 53/54; B01D 53/565; B01D 53/62; B01D 53/74; B01D 53/86; B01D 53/8628; B01D 53/8631; B01D 53/8643; B01D 53/865; B01D 53/8653; B01D 53/922
USPC .......... 502/60, 74, 77, 79, 85; 422/177, 180; 423/235, 239.1, 239.2
See application file for complete search history.

(56) References Cited

U.S. PATENT DOCUMENTS 4,552,855 A 11/1985 Ozin et al.
6,362,123 B1 * 3/2002 Tsao .......................... B01J 29/12
502/66

(Continued)

FOREIGN PATENT DOCUMENTS

JP S59-132940 A 7/1984
JP 2002-534558 A 10/2002
(Continued)

OTHER PUBLICATIONS

Ortalan V, et al. Abstractor "Direct imaging of single metal atoms and clusters in the pores of dealuminated HY zeolite", Nat Nanotechnol. 2010, 7, p. 506.*
(Continued)

*Primary Examiner* — Elizabeth D Wood
(74) *Attorney, Agent, or Firm* — Oliff PLC

(57) ABSTRACT

An improved cluster-supporting catalyst has heteroatom-removed zeolite particles, and catalyst metal clusters supported within the pores of the heteroatom-removed zeolite particles. A method for producing a cluster-supporting catalyst includes the following steps: providing a dispersion liquid containing a dispersion medium and the heteroatom-removed zeolite particles dispersed in the dispersion medium; and in the dispersion liquid, forming catalyst metal clusters having a positive charge, and supporting the catalyst metal clusters within the pores of the heteroatom-removed zeolite particles through an electrostatic interaction.

14 Claims, 20 Drawing Sheets

(51) Int. Cl.

| | | |
|---|---|---|
| *B01J 37/02* | (2006.01) | |
| *B01J 29/44* | (2006.01) | |
| *B01J 23/40* | (2006.01) | |
| *B01J 29/12* | (2006.01) | |
| *B01J 29/46* | (2006.01) | |
| *B01J 37/16* | (2006.01) | |
| *B01J 29/14* | (2006.01) | |
| *B01J 29/10* | (2006.01) | |
| *B01J 23/42* | (2006.01) | |
| *B01J 29/076* | (2006.01) | |
| *B01J 29/60* | (2006.01) | |
| *B01J 29/62* | (2006.01) | |
| *B01J 29/072* | (2006.01) | |
| *B01J 29/64* | (2006.01) | |
| *B01J 29/068* | (2006.01) | |
| *B01J 29/16* | (2006.01) | |
| *B01J 29/48* | (2006.01) | |
| *B01J 29/40* | (2006.01) | |
| *B01J 35/00* | (2006.01) | |
| *B01J 23/745* | (2006.01) | |
| *B01J 29/08* | (2006.01) | |
| *B01J 37/34* | (2006.01) | |
| *F01N 3/08* | (2006.01) | |
| *F01N 3/10* | (2006.01) | |
| *B01J 23/74* | (2006.01) | |
| *B01J 23/26* | (2006.01) | |
| *B01J 23/28* | (2006.01) | |
| *B01J 23/30* | (2006.01) | |
| *B01J 23/16* | (2006.01) | |
| *B01J 23/36* | (2006.01) | |
| *B01J 23/46* | (2006.01) | |
| *B01J 23/50* | (2006.01) | |
| *B01J 23/44* | (2006.01) | |
| *B01J 23/34* | (2006.01) | |

(52) U.S. Cl.
CPC ....... *B01J 35/0073* (2013.01); *B01J 37/0203* (2013.01); *B01J 37/0209* (2013.01); *B01J 37/0211* (2013.01); *B01J 37/0213* (2013.01); *B01J 37/16* (2013.01); *B01J 37/346* (2013.01); *B01J 37/349* (2013.01); *F01N 3/0842* (2013.01); *F01N 3/0857* (2013.01); *F01N 3/101* (2013.01); *B01J 23/16* (2013.01); *B01J 23/26* (2013.01); *B01J 23/28* (2013.01); *B01J 23/30* (2013.01); *B01J 23/34* (2013.01); *B01J 23/36* (2013.01); *B01J 23/44* (2013.01); *B01J 23/46* (2013.01); *B01J 23/462* (2013.01); *B01J 23/50* (2013.01); *B01J 23/74* (2013.01); *B01J 2229/16* (2013.01); *B01J 2229/186* (2013.01); *B01J 2229/37* (2013.01); *B01J 2523/41* (2013.01); *B01J 2523/42* (2013.01); *B01J 2523/55* (2013.01); *B01J 2523/67* (2013.01); *B01J 2523/74* (2013.01); *B01J 2523/821* (2013.01); *B01J 2523/824* (2013.01); *B01J 2523/827* (2013.01); *B01J 2523/828* (2013.01); *B01J 2523/842* (2013.01); *B01J 2523/845* (2013.01); *B01J 2523/847* (2013.01)

(56) References Cited

U.S. PATENT DOCUMENTS

| | | | |
|---|---|---|---|
| 9,150,486 B2* | 10/2015 | Geboers | .............. C11C 3/14 |
| 2007/0227351 A1* | 10/2007 | Garcia-Martinez | ...... B01J 20/18 95/90 |
| 2012/0010453 A1* | 1/2012 | Ohkubo | ............... B01J 29/068 585/638 |
| 2013/0281284 A1 | 10/2013 | Matsuo et al. | |

FOREIGN PATENT DOCUMENTS

| | | |
|---|---|---|
| JP | 2006-212464 A | 8/2006 |
| JP | 2010-69415 A | 4/2010 |
| JP | 2012-148272 A | 8/2012 |
| WO | 91-11501 A1 | 8/1991 |
| WO | 00/40676 A1 | 7/2000 |
| WO | 2017/115767 A1 | 7/2017 |

OTHER PUBLICATIONS

Guzman et al. "Supported molecular catalysts: metal complexes and clusters on oxides and zeolites", 2003, pp. 3303-3318.*

Semaltianos N.G., "Nanoparticles by Laser Ablation of Bulk Target Materials in Liquids", pp. 67-92, From: Handbook of Nanoparticles, 2016.*

Ortalan, et al., "Direct imaging of single metal atoms and clusters in the pores of dealuminated HY zeolite", pp. 506-510, Nature Nanotechnology, vol. 5, 2010.*

Juan C. Fierro-Gonzalez, et al., "Gold Nanoclusters Entrapped in the a-Cages of Y Zeolites: Structural Characterization by X-ray Absorption Spectroscopy", The Journal of Physical Chemistry C, 2007, vol. 111, p. 6645-6651.

Ann J. Liang, et al., "Time-Resolved Structural Characterization of Formation and Break-up of Rhodium Clusters Supported in Highly Dealuminated Y Zeolite", The Journal of Physical Chemistry C, 2008, vol. 112, p. 18039-18049.

O. P. Tkachenko, et al., "Reduction of Copper in Porous Matrixes. Stepwise and Autocatalytic Reduction Routes", The Journal of Physical Chemistry B, 2005, vol. 109, p. 20979-20988.

Salim Caliskan, et al, "Zeolite confined rhodium(O) nanoclusters as highly active, reusable, and long-lived catalyst in he methanolysis of ammonia-borane", Applied Catalysis B: Environmental, 93: pp. 387-394, Oct. 19, 2009.

Shuichi Hashimoto, "Fabrication of Gold Nanoparticle-Doped Zeolite L Crystals and Characterized by Optical Microscopy: Laser Ablation- and Crystallization Inclusion-Based Approach", The Journal of Physical Chemistry C Letters (2008, 112, pp. 15089-15093), Sep. 5, 2008.

* cited by examiner

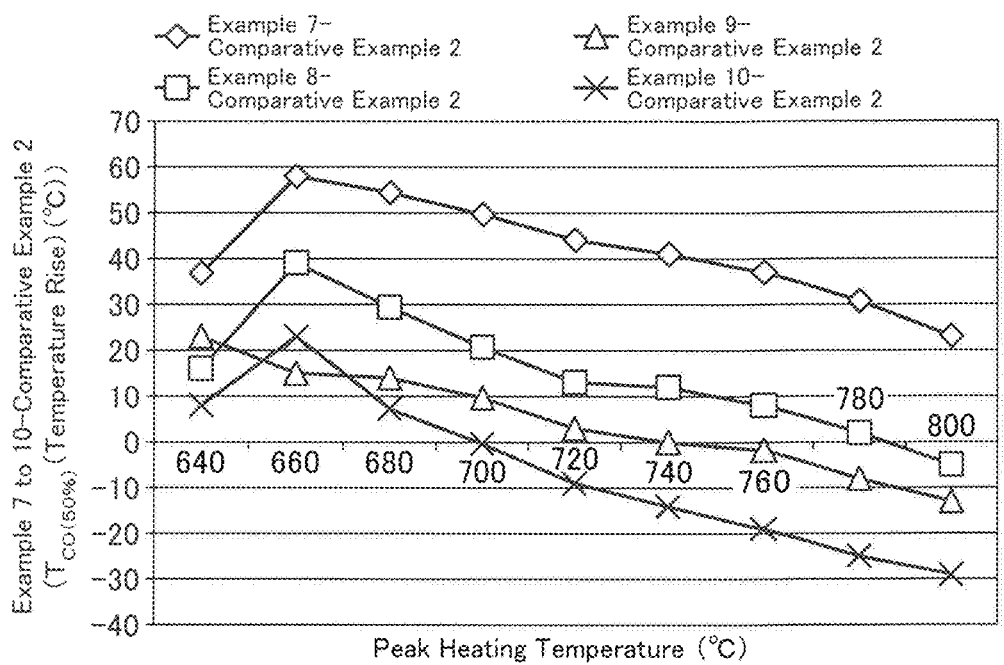
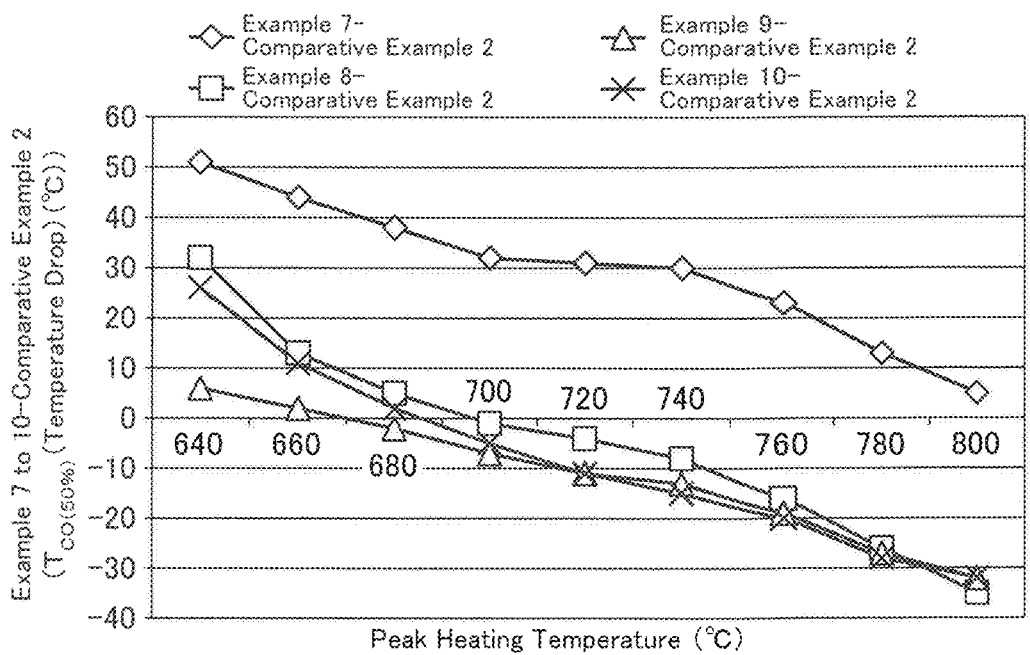

CLUSTER SUPPORTED CATALYST AND METHOD FOR PRODUCING SAME

FIELD

The present invention relates to a cluster-supporting catalyst and a production method thereof. More specifically, the present invention relates to a cluster-supporting catalyst for exhaust gas purification, liquid-phase chemical synthesis reaction, gas-phase chemical synthesis reaction, fuel cell reaction, air cell reaction, etc., and a production method thereof.

BACKGROUND

A supported catalyst obtained by supporting a catalyst metal on a carrier is used in many fields and is used as a catalyst for exhaust gas purification, liquid-phase chemical synthesis reaction, gas-phase chemical synthesis reaction, fuel cell reaction, air cell reaction, etc.

As to such a supported catalyst, it is known that the size of the catalyst metal particles supported on a carrier is important. In this connection, for example, Patent Document 1 has proposed a supported catalyst in which catalyst metal particles having a size of 1 to 10 nm are supported on a carrier of alumina, silica, titania, zirconia or a combination thereof. In addition, Patent Document 2 has proposed a catalyst for nitrogen oxide, in which copper ion is supported on zeolite by ion exchange. Furthermore, Patent Document 3 has proposed a technique where palladium supported on zeolite by ion exchange is dried and then clustered by a reduction treatment to prepare a cluster-supporting catalyst, and the cluster-supporting catalyst is used for a coupling reaction, etc.

Further, Patent Document 4, which is not disclosed at the filing date of the priority application of the present application, discloses a cluster-supporting catalyst comprising porous carrier particles having acid sites such as zeolite, and catalyst metal clusters supported within the pores of the porous carrier particles; and a method for producing the same.

Incidentally, it is known that a zeolite particle used as an absorbent, etc. changes its property, when at least part of aluminum atoms constituting the alumino-silicate zeolite structure thereof is removed from the zeolite skeleton such that the zeolite particle is changed to a dealuminated-zeolite particle.

RELATED ART

Patent Document

[Patent Document 1] JP2006-212464
[Patent Document 2] JP2012-148272
[Patent Document 3] JP2010-69415
[Patent Document 4] PCT/JP2016/088792

SUMMARY

Problems to be Solved by the Invention

Although various supported catalysts have been proposed as described above, a supported catalyst having further improved catalytic activity is demanded. Particularly, a supported catalyst having further improved catalytic activity, which uses a reduced amount of expensive noble metals or does not use expensive noble metals, is demanded.

Among others, in the field of exhaust gas purification, a supported catalyst having an improved low-temperature activity for carbon monoxide (CO) oxidation is demanded.

Accordingly, the present invention provides a cluster-supporting catalyst satisfying these demands, and a production method thereof.

Means to Solve the Problems

The present inventors have found that a specific cluster-supporting catalyst has improved catalyst activity, and arrived at the present invention described below.

Embodiment 1

A cluster-supporting catalyst, comprising heteroatom-removed zeolite particles, and catalyst metal clusters supported within the pores of the heteroatom-removed zeolite particles.

Embodiment 2

The cluster-supporting catalyst according to embodiment 1, wherein the catalyst metal clusters have a positive charge, and are supported on the acid sites within the pores of the heteroatom-removed zeolite particles through an electrostatic interaction.

Embodiment 3

The cluster-supporting catalyst according to embodiment 1 or 2, wherein the heteroatom-removed zeolite particles are aluminum-removed zeolite particles.

Embodiment 4

The cluster-supporting catalyst according to any one of embodiments 1 to 3, wherein the catalyst metal clusters are selected from the group consisting of clusters of platinum, palladium, rhodium, iridium, ruthenium, silver, titanium, vanadium, chromium, manganese, iron, cobalt, nickel, copper, zinc, molybdenum, tungsten, rhenium, silicon and germanium, and a combinations thereof.

Embodiment 5

The cluster-supporting catalyst according to embodiment 4, wherein the catalyst metal clusters are selected from the group consisting of clusters of copper and iron, and a combinations thereof.

Embodiment 6

The cluster-supporting catalyst according to any one of embodiments 1 to 5, which is an exhaust gas purification catalyst.

Embodiment 7

The cluster-supporting catalyst according to any one of embodiments 1 to 5, which is a catalyst for liquid-phase synthesis reaction, gas-phase synthesis reaction, fuel cell reaction, or air cell reaction.

Embodiment 8

A catalyst device, comprising the cluster-supporting catalyst according to any one of embodiments 1 to 7, and a substrate supporting the catalyst.

Embodiment 9

A method for producing a cluster-supporting catalyst,
wherein the cluster-supporting catalyst comprises heteroatom-removed zeolite particles, and catalyst metal clusters supported within the pores of the heteroatom-removed zeolite particles; and
wherein the method comprises the followings steps:
providing a dispersion liquid containing a dispersion medium and the heteroatom-removed zeolite particles dispersed in the dispersion medium, and
forming, in the dispersion liquid, catalyst metal clusters having a positive charge, and supporting the catalyst metal clusters within the pores of the heteroatom-removed zeolite particles through an electrostatic interaction.

Embodiment 10

The method according to embodiment 9, wherein the dispersion liquid is provided by pulverizing the heteroatom-removed zeolite particles, and dispersing the pulverized heteroatom-removed zeolite particles in the dispersion medium.

Embodiment 11

The method according to embodiment 9 or 10, wherein the clusters are formed in the dispersion liquid by any of the following methods:
a method of laser ablation in liquid,
a method of microwave ablation in liquid,
a method of plasma ablation in liquid,
a positive-negative inversion method, and
a method of reduction in liquid.

Embodiment 12

The method according to embodiment 11, wherein metal ions constituting the catalyst metal cluster are reduced by a reducing agent through the method of reduction in liquid to form the cluster in the dispersion liquid, and the dispersion liquid is irradiated with plasma and/or microwave to promote the reduction by the reducing agent.

Embodiment 13

The method according to any one of embodiments 9 to 12, wherein the dispersion medium of the dispersion liquid is an organic solvent.

Effects of the Invention

According to the present invention, an improved catalytic activity can be provided. Furthermore, according to the method of the present invention for evaluating the size of catalyst metal particles, the size of catalyst metal particles can be evaluated in a supported catalyst.

BRIEF DESCRIPTION OF THE DRAWINGS

FIGS. 6 A and B are graphs illustrating the carbon monoxide purification performance with respect to the rhodium cluster-supporting catalysts of Reference Example 4 and Reference Comparative Example 2.

FIGS. 7 A and B are graphs illustrating the carbon monoxide purification performance with respect to the rhodium cluster-supporting catalysts of Reference Example 5 and Reference Comparative Example 3.

FIGS. 8 A and B are graphs illustrating the carbon monoxide purification performance with respect to the rhodium-supported catalysts of Reference Example 6 and Reference Comparative Example 4.

FIGS. 9 A and B are graphs illustrating the carbon monoxide purification performance with respect to the rhodium cluster-supporting catalysts of Reference Examples 7 to 10; FIG. 9A is the results of the temperature rising process and FIG. 9B is the results of the temperature dropping process.

MODE FOR CARRYING OUT THE INVENTION

Figure 1:
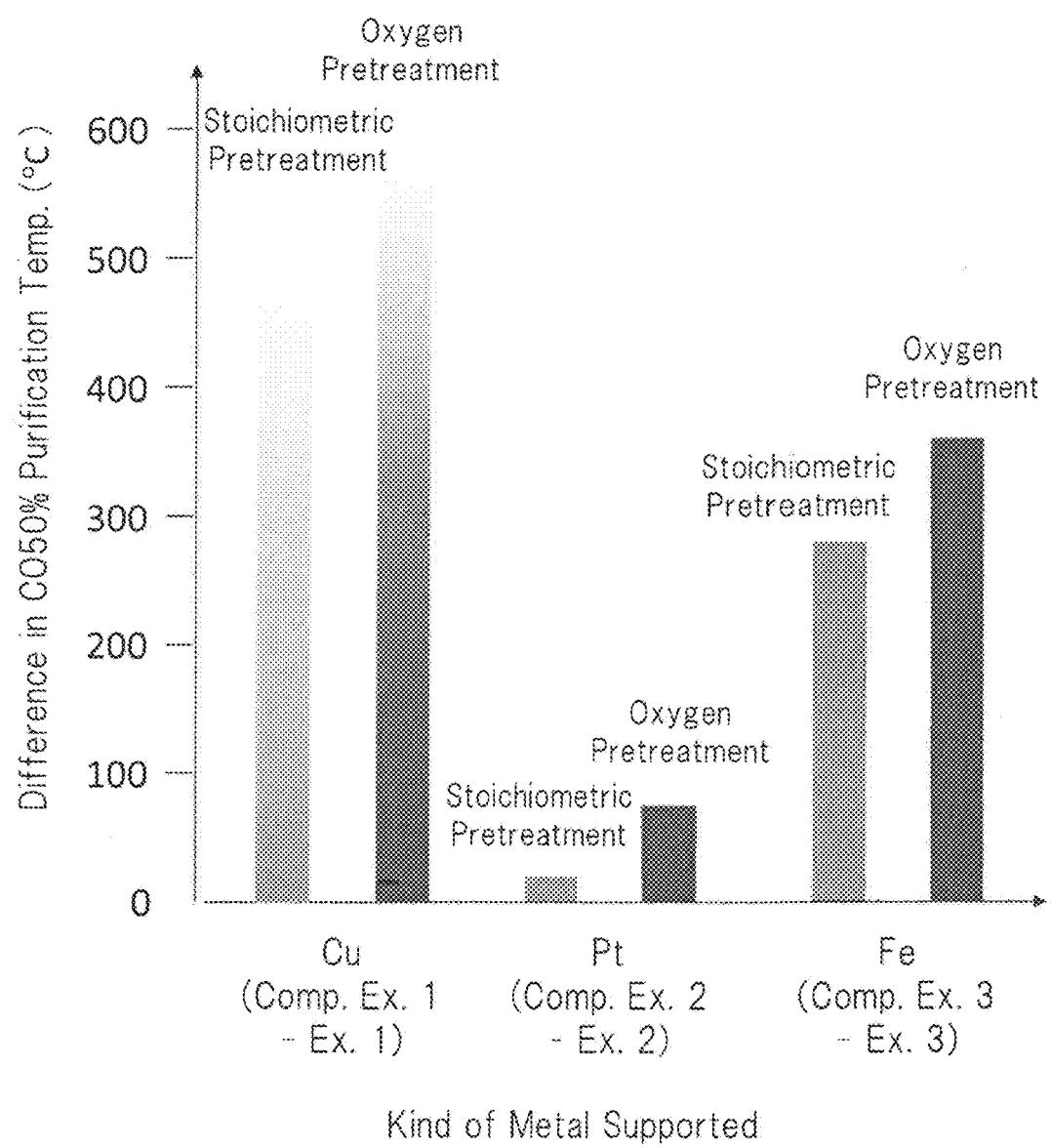
FIG. 1 is a graph illustrating the carbon monoxide (CO) purification performance with respect to the catalysts of Examples 1 to 3 and Comparative Examples 1 to 3.

The embodiments of the present invention is described in detail below. The present invention is not limited to the following embodiments and can be implemented by making various modifications therein without departing from the scope of the gist of the present invention.

<<Cluster-Supporting Catalyst>>

The cluster-supporting catalyst of the present invention includes heteroatom-removed zeolite particles, and catalyst metal clusters supported within the pores of the heteroatom-removed zeolite particles. The cluster-supporting catalyst of the present invention can be produced by the method of the present invention described below. Further, the cluster-supporting catalyst of the present invention can be produced by an ion-exchange and reducing method in which catalyst metal ions are supported on heteroatom-removed zeolite particles through ion-exchange, and the supported catalyst metal ions are reduced by a reducing agent.

The catalyst metal clusters can have a positive charge, and be supported on the sites having negative charge within the pores of the heteroatom-removed zeolite particles, particularly on the acid sites within the pores of the heteroatom-removed zeolite particles, through an electrostatic interaction. The cluster-supporting catalyst of the present invention can be produced by the method of the present invention described below.

The cluster-supporting catalyst of the present invention can exert an excellent catalytic activity, since catalyst metal clusters are supported within the pores of the heteroatom-removed zeolite particles.

Although not to be bound by theory, the excellent catalytic activity of the catalyst is believed to be attributable to the fact that the catalyst metal clusters supported within the pores become a superior state as a catalyst due to an interaction with defect sites of the heteroatom-removed zeolite particles, i.e. due to an interaction with defect site of the heteroatom-removed zeolite particles, which is obtain by removing heteroatom other than silicon, such as aluminum, from zeolite through a heteroatom removing treatment.

Also, although not to be bound by theory, the excellent catalytic activity of the catalyst of the present invention, which is produced by the method of the present invention described below, are believed to be attributable to the fact that, for example, the clusters having a positive charge are stably fixed within the pores of the zeolite, particularly on the sites having negative charge within the pores of the zeolite, more particularly on the acid sites having negative charge within the pores of the zeolite; and/or the fact that the clusters supported within the pores have a relatively uniform size.

Incidentally, the "cluster" is generally defined as an aggregate of up to several hundred chemical species, but in the present invention, the "cluster-supporting catalyst" means a catalyst in which a fine catalyst metal including a clusters are supported on the carrier particle.

The cluster-supporting catalyst of the present invention can be preferably used, for example, as an exhaust gas purification catalyst, a catalyst for liquid-phase compound synthesis reaction, a catalyst for gas-phase synthesis reaction, a catalyst for fuel cell reaction, or a catalyst for air cell reaction, particularly, as an exhaust gas purification catalyst.

<Catalyst Metal>

The catalyst metal constituting the catalyst metal clusters may be any metal or half-metal usable as a catalyst in the intended application. The catalyst metal is selected, for example, from the group consisting of gold, silver, platinum, palladium, rhodium, iridium, ruthenium, titanium, vanadium, chromium, manganese, iron, cobalt, nickel, copper, zinc, molybdenum, tungsten, rhenium, silicon, germanium, and a combination thereof.

In the cluster-supporting catalyst of the present invention, the catalyst metal cluster supported within the pores become a superior state as a catalyst, and therefore the cluster-supporting catalyst of the present invention can exert excellent catalyst activity even when non-noble metal is used as a catalyst metal. Therefore, the present invention is particularly effective, when non-noble metal, e.g. a catalyst metal selected from a group consisting of silver, titanium, vanadium, chromium, manganese, iron, cobalt, nickel, copper, zinc, molybdenum, tungsten, rhenium, silicon, germanium, and combinations thereof, particularly a catalyst metal selected from a group consisting of iron, copper, and combinations thereof is used as a catalyst metal.

Incidentally, in view of catalytic activity, the catalyst metal is preferably particles having a fine particle diameter. As described below regarding the method of the present invention for judging the metal particle size, the catalyst metal particles can be confirmed to have a fine particle diameter by utilizing a phenomenon that when the metal particles have a particle diameter of 1 nm or less, particularly, when the metal particles are of a cluster size, the metal particles emits fluorescence upon irradiation with excitation light.

<Heteroatom-Removed Zeolite Particle>

The heteroatom-removed zeolite particles may be any heteroatom-removed zeolite particles usable in the intended application.

The heteroatom-removed zeolite may be A-type (code: LTA), ferrierite type (code: FER), MCM-22 type (code: MWW), ZSM-5 type (code: MFI), silicalite type, mordenite type (code: MOR), L-type (code: LTL), Y-type and X-type (code: FAU), beta-type (code: BEA), SSZ-type (code: CHA), and a combination thereof.

According to the present invention, the heteroatom-removed zeolite particles mean zeolite particles wherein at last part of heteroatom other than silicon atom constituting zeolite obtained by firing, such as aluminum atom, is removed from a skeleton of zeolite. The heteroatom other than silicon atom includes elements selected from a group consisting of (1) iron which is a divalent and trivalent element, (2) aluminum, boron, and gallium which are trivalent elements, (3) titanium, germanium, and tin which are tetravalent elements, (4) phosphorous which is pentavalent element, and (5) combinations thereof. Regarding this, for example, it si known that phosphorous can form a zeolite as silico-alumino-phosphate zeolite.

The removal rate of heteroatom from zeolite particles, i.e. the ratio of heteroatom removed from a skeleton of zeolite by a heteroatom removing treatment, the zeolite being obtained by firing, can be 5 mol % or more, 10 mol % or more, 20 mol % or more, 30 mol % or more, 40 mol % or more, 50 mol % or more, 60 mol % or more, 70 mol % or more, 80 mol % or more, or 90 mol % or more. The amount of heteroatom before and after heteroatom removing treatment can be determined by Inductively Coupled Plasma-Optical Emission Spectrometry (ICP-OES).

The silicon atom/heteroatom ratio of the heteroatom-removed zeolite before heteroatom-removing treatment can be 100 or less, 90 or less, 80 or less, 70 or less, 60 or less, 50 or less, 40 or less, or 30 or less, and the silicon atom/heteroatom ratio of the heteroatom-removed zeolite after heteroatom-removing treatment can be 100 or more, 150 or more, 200 or more, 250 or more, or 300 or more.

The heteroatom removing treatment can be conducted through a known method. For example, the heteroatom removing treatment can be conducted by a treatment using high-temperature water vapor, a treatment using mineral acid such as hydrochloric acid, nitric acid, or sulfuric acid, a treatment using aqueous solution of fluoride such as hexafluorosilicate, a treatment using silicon tetrachloride, and a treatment using aqueous solution of salt such as sodium chloride.

<<Catalyst Device>>

The catalyst device of the present invention includes the cluster-supporting catalyst of the present invention, a substrate supporting the cluster-supporting catalyst, and optionally, a vessel holding the substrate.

In the catalyst device of the present invention, a honeycomb substrate, particularly, a cordierite-made honeycomb substrate, can be used as the substrate. Furthermore, in the catalyst device of the present invention, a vessel made of a metal such as stainless steel can be used as the optional vessel.

<<Production Method of Cluster-Supporting Catalyst>>

In the method of the present invention for producing a cluster-supporting catalyst, a cluster-supporting catalyst, particularly, the cluster-supporting catalyst of the present invention, including heteroatom-removed zeolite particles, and catalyst metal clusters supported within the pores of the heteroatom-removed zeolite particles, is produced.

This method includes: providing a dispersion liquid containing a dispersion medium and heteroatom-removed zeolite particles dispersed in the dispersion medium; and in the dispersion liquid, forming catalyst metal clusters having a positive charge, and supporting the catalyst metal clusters on the site having negative charge within the pores of the heteroatom-removed zeolite particles, particularly the acid sites within the pores of the heteroatom-removed zeolite particles, through an electrostatic interaction. The method may further include drying and firing the heteroatom-removed zeolite particles having supported thereon the catalyst metal clusters.

According to the method of the present invention, in a dispersion liquid in which heteroatom-removed zeolite particles are present, catalyst metal clusters are formed and the formed catalyst metal clusters are supported within the pores of the heteroatom-removed zeolite particles, whereby catalyst metal clusters having a controlled size, particularly, catalyst metal clusters having a relatively uniform size, can be supported within the pores of the heteroatom-removed zeolite particles. The size of the catalyst metal clusters can be controlled by adjusting the conditions for forming the catalyst metal clusters in the dispersion liquid.

In the method of the present invention, catalyst metal clusters can be supported within the pores of the heteroatom-removed zeolite particles through an electrostatic interaction between catalyst metal clusters, and sites having negative charge of the heteroatom-removed zeolite particles, particularly acid site within the pores of the heteroatom-removed zeolite particles.

The electrostatic interaction enables the catalyst metal clusters having a positive charge to be supported on the sites having negative charge of the heteroatom-removed zeolite particles, particularly the acid sites having a negative charge within the pores of the heteroatom-removed zeolite particles.

<Catalyst Metal>

As to the catalyst metal usable in the cluster-supporting catalyst of the present invention, the description regarding the catalyst of the present invention may be referred to.

<Heteroatom-Removed Zeolite Particles>

As to the heteroatom-removed zeolite particles usable in the cluster-supporting catalyst of the present invention, the description regarding the catalyst of the present invention may be referred to.

The catalyst metal clusters having a positive charge can be supported on the cites having a negative charge, particularly the acid sites within the pores of the zeolite particles having a negative charge. Accordingly, the zeolite particles preferably have a relatively small zeta potential, and may have a zeta potential of, for example, −50 mV or less, −70 mV or less, −90 mV or less, or −100 mV or less.

In the method of the present invention, the dispersion liquid can be provided by pulverizing the heteroatom-removed zeolite particles, and dispersing the pulverized heteroatom-removed zeolite particles in the dispersion medium.

In this case, since the heteroatom-removed zeolite particles are previously pulverized, the catalyst metal clusters can be accelerated to be supported within the pores of the heteroatom-removed zeolite particles. Incidentally, such a pulverized heteroatom-removed zeolite particles have sometimes become amorphous, and the heteroatom-removed zeolite particles may therefore be recrystallized, if desired, by annealing before or after the catalyst metal clusters are supported.

<Dispersion Medium of Dispersion Liquid>

As the dispersion medium of the dispersion liquid, any dispersion medium capable of drawing the catalyst metal clusters into the pores of the heteroatom-removed zeolite particles through an electrostatic interaction between the catalyst metal clusters, and the heteroatom-removed zeolite particles, particularly the acid sites of the heteroatom-removed zeolite particles, can be used.

In this connection, in the case where the catalyst metal clusters are supported within the pores of the heteroatom-removed zeolite particles through an electrostatic interaction, the dispersion medium can be selected so that the surface of the catalyst metal clusters can have a positive charge, and the heteroatom-removed zeolite particles, particularly the acid sites within the pores of the heteroatom-removed zeolite particles can have a negative charge. Accordingly, in order to accelerate the catalyst metal clusters to be supported within the pores of the heteroatom-removed zeolite particles, the zeta potential and/or the ionization rate of the catalyst metal clusters and/or the heteroatom-removed zeolite particles can be adjusted by adjusting the pH of the dispersion medium and/or adding a salt to the dispersion medium.

As regards this, the surface potentials of the catalyst metal clusters and the heteroatom-removed zeolite particles cannot be directly measured, but can be known indirectly by measuring the zeta potential (interfacial electrokinetic potential).

For example, the zeta potential of platinum cluster greatly depends on pH and when the pH is 8 or less, the zeta potential slightly increases as the pH decreases. This is considered to occur because the platinum atom on the surface of the platinum cluster has been partially oxidized and the platinum atom on a part of the platinum cluster surface is protonated into Pt—$H^+$ the moment the oxidized platinum atom enters the Pt—OH state along with decrease in pH, as a result, the positive charge density increases, leading to an increase in the zeta potential.

On the other hand, when the pH is more than 8, the zeta potential of the platinum cluster rapidly decreases as the pH increases. This is considered to occur because the platinum atom oxidized along with increase in pH becomes Pt—$O^-$ and furthermore, the platinum cluster surface is partially deprotonated, as a result, the positive charge density decreases, leading to a decrease in the zeta potential.

In the case of using an electrostatic interaction, the dispersion medium may be aqueous or nonaqueous, but it is generally preferable to use a nonaqueous dispersion medium, for example, an organic solvent. Because, if an aqueous dispersion medium is used, stabilization of the catalyst metal clusters occurs in the dispersion medium due to the high dielectric constant of water (dielectric constant: 80), i.e., the high polarity, and the catalyst metal clusters may thereby not be sufficiently supported within the pores of the heteroatom-removed zeolite particles.

On the other hand, in the case of using a dispersion medium having a relatively low polarity, i.e., a dispersion medium having a relatively low dielectric constant, the catalyst metal clusters are not stabilized in the dispersion medium and can be supported within the pores of the heteroatom-removed zeolite particles through an electrostatic interaction and stabilized there.

Accordingly, as the dispersion medium, a dispersion medium having a lower dielectric constant than that of water (dielectric constant: 80), for example, a dispersion medium having a dielectric constant of 50 or less, 40 or less, 30 or less, 25 or less, or 20 or less, can be used. Specifically, acetone (dielectric constant: 20), 2-propanol (dielectric constant: 18), ethanol (dielectric constant: 25), methanol (dielectric constant: 32), carbon tetrachloride (dielectric constant: 2.2), etc. can be used as the dispersion medium.

<Formation of Catalyst Metal Cluster>

The catalyst metal cluster, particularly, the catalyst metal clusters having a positive charge, can be formed by any method in the dispersion medium. The method for forming such catalyst metal clusters includes methods such as method of laser ablation in liquid, method of microwave ablation in liquid, method of plasma abrasion in liquid, positive-negative inversion method, and method of reduction in liquid (liquid-phase reduction method).

The method of laser ablation in liquid, method of microwave ablation in liquid and method of plasma ablation in liquid are a method of forming catalyst metal clusters by irradiating a catalyst metal target disposed in a dispersion medium with laser, microwave or plasma.

In the positive-negative inversion method, first, negatively charged zeolite and a metal ion source having a negative charge are caused to be present together in a solution, particularly, in an aqueous solution. Specifically, for example, in the case of using $H_2[PtCl_6]$, platinum is caused to be present as a negative ion of $[PtCl_6]^{2-}$. In this state, an ion exchanger is not produced due to repulsive force between negative charges. A pulsed laser is converged and introduced into this solution. According to this introduction, a plasma is generated in the laser focus region to produce various chemical species (a metal ion from which a ligand is removed, a plasma metal ion produced after electron detachment of a negative metal ion source, etc.) from the metal ion source, and furthermore, a neutral metal atom forms an aggregate with a positive metal ion to produce a positively charged metal clusters. The positively charged metal cluster produced in this way is supported on the sites having a negative charge, particularly the acid sites of zeolite through an electrostatic interaction.

The method of reduction in liquid is a method of forming catalyst metal clusters by reducing the catalyst metal ion with use of a reducing agent.

In the method of reduction in liquid, any reducing agent capable of reducing the catalyst metal ion in liquid can be used. Specifically, for example, a hydride reducing agent such as sodium borohydride, and an alcohol such as propanol, can be used as the reducing agent. In addition, in the method of reduction in liquid, it is also preferable to use a dispersion medium stable to the reducing agent used, which is a dispersion medium capable of dissolving a metal salt as a catalyst metal ion supply source and the reducing agent. Accordingly, the same compound can be used for both the reducing agent and the dispersant, for example, an alcohol can be used for both the reducing agent and the dispersant.

In the method of reduction in liquid, the reduction of the catalyst metal ion may be promoted by optionally using microwave or plasma in liquid, in addition to the reducing agent, Incidentally, in order to form catalyst metal clusters having a controlled size, e.g., catalyst metal clusters having a relatively uniform size, for example, in the method of reduction in liquid, uniform reduction of the catalyst metal ion can be promoted in the dispersion liquid by optionally using microwave or plasma in liquid, in addition to the reducing agent.

The present invention is described in greater detail below by referring to Examples, but needless to say, the scope of the present invention is not limited by these Examples.

EXAMPLES

Example 1 and Comparative Example 1 (Copper Cluster-Supporting Catalyst)

Example 1

Y-type zeolite particles ($NH_4^+$ type, silica/alumina ratio (SAR):28.9) were treated in 25 mass % $H_2SO_4$ solution at 75° C. for 1 hour to remove aluminum from the zeolite particles. After the aluminum removing treatment, the resulting zeolite particles were sufficiently rinsed in a hot water of 60° C. to remove residual sulfur content which may work as a catalyst poison. The obtained aluminum-removed Y-type zeolite particles had a sulfur content below the detection limit, according to Inductively Coupled Plasma-Optical Emission Spectrometry (ICP-OES).

The SAR of the obtained aluminum-removed Y-type zeolite particles was 254 according to ICP-OES, meaning that the ratio of aluminum atom removed from the skeleton of the zeolite by the aluminum-removing treatment was about 89%.

Thereafter, copper-cluster supporting aluminum-removed zeolite was obtained by a laser ablation of copper target in acetone.

Figure 2A:
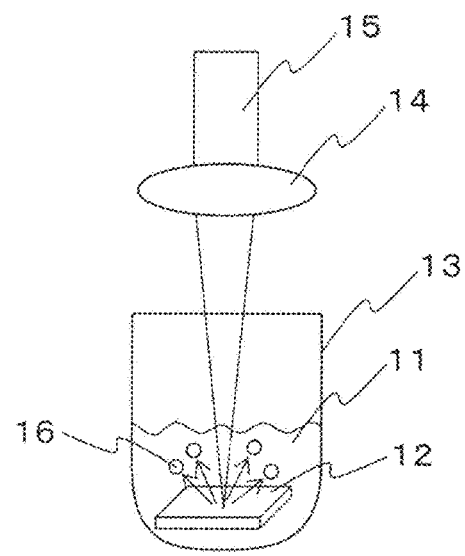
FIGS. 2 A and B are diagrams illustrating one embodiment of the method for producing the cluster-supporting catalyst of the present invention.
Figure 2B:
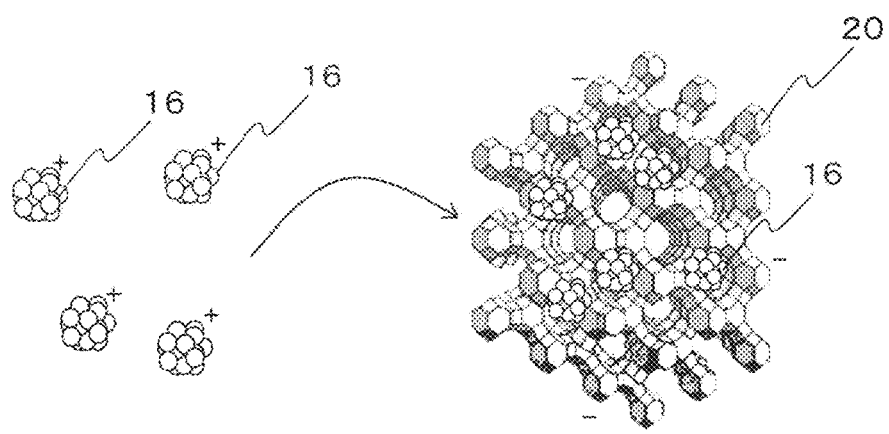

More specifically, as illustrated in FIG. 2A, acetone 11 as a dispersion medium having dispersed therein carrier particles (not shown) was put in a vessel 13, a plate 12 of copper was placed in acetone 11, the plate 12 of copper in acetone 11 was irradiated with a laser 15 through a lens 14, and a copper cluster 16 was formed in the acetone by laser ablation. The thus-formed copper cluster 16 took on a positive charge and therefore, as illustrated in FIG. 2B, was electrically drawn to sites having a negative charge, i.e., acid sites, of the zeolite carrier particles 20 as carrier particles, and supported there.

The laser ablation was conducted such that the amount of copper ablated from the copper target was 0.8 mass %. The laser light was the basic wave (1,064 nm, 10 Hz) of a Nd:YAG laser, and the intensity thereof was 2 W.

Comparative Example 1

The catalyst of Comparative Example 1, in which copper clusters were supported on zeolite, was obtained in the same manner as Example 1, excepting that aluminum-removing treatment was not conducted for the zeolite particles.

<Evaluation>

The catalysts of Example 1 and Comparative Example 1 were heated in a stoichiometric atmosphere (CO: 0.65 vol %, $O_2$: 0.25 vol %, NO: 0.15 vol %, He: balance) at 800° C. for 0.5 hours to obtain the catalysts pretreated under stoichiometric atmosphere. Further, the catalysts of Example 1 and Comparative Example 1 were heated in an oxygen atmosphere ($O_2$: 10 vol %, He: balance) at 800° C. for 0.5 hours to obtain the catalysts pretreated under oxygen atmosphere.

For the catalysts pretreated under stoichiometric atmosphere and the catalysts pretreated under oxygen atmosphere, the change in CO purification ratio was evaluate in a dry reaction gas atmosphere (CO:0.65 vol %, $O_2$:0.25 vol %, NO:0.15 vol %, He:balance) of 1 atm, at the spatial velocity of 10,000 h−1, and under the temperature dropping condition from 800° C.

As a result, the catalysts of Comparative Example 1, which were pretreated under stoichiometric atmosphere and pretreated under oxygen atmosphere, did not reach CO 50%. On the other hand, the catalysts of Example 1, which were pretreated under stoichiometric atmosphere and pretreated under oxygen atmosphere, reached CO 50%. For both of the catalysts pretreated under stoichiometric atmosphere and the catalysts pretreated under oxygen atmosphere, the differences between CO 50% purification temperatures of the catalysts of Comparative Example 1 and Example 1 are shown in FIG. 1.

As shown in FIG. 1, the copper-cluster supporting aluminum-removed zeolite catalyst of Example 1 had a remarkably better low-temperature catalyst activity than the copper-cluster supporting (non-aluminum-removed) zeolite catalyst of Comparative Example 1.

Example 2 and Comparative Example 2 (Platinum-Cluster Supporting Catalyst)

Example 2

The catalyst of Example 2, in which platinum clusters were supported on aluminum-removed zeolite particles, was obtained in the same manner as Example 1, excepting that a platinum target was used in place of the copper target in the laser ablation process.

Comparative Example 2

The catalyst of Comparative Example 2, in which platinum clusters were supported on zeolite, was obtained in the same manner as Example 2, excepting that aluminum-removing treatment was not conducted for the zeolite particles.

<Evaluation>

The change in CO purification ratios of the catalysts Example 2 and Comparative Example 2 were evaluated in the same manner as Example 1 and Comparative Example 1.

For both of the catalysts pretreated under stoichiometric atmosphere and the catalysts pretreated under oxygen atmosphere, the differences between CO 50% purification temperatures of the catalysts of Comparative Example 2 and Example 2 are shown in FIG. 1.

As shown in FIG. 1, the platinum-cluster supporting aluminum-removed zeolite catalyst of Example 2 had a remarkably better low-temperature catalyst activity than the platinum-cluster supporting (non-aluminum-removed) zeolite catalyst of Comparative Example 2.

Example 3 and Comparative Example 3 (Iron Cluster-Supporting Catalyst)

Example 3

The catalyst of Example 3, in which iron clusters were supported on aluminum-removed zeolite particles, was obtained in the same manner as Example 1, excepting that an iron target was used in place of the copper target in the laser ablation process.

Comparative Example 3

The catalyst of Comparative Example 3, in which iron clusters were supported on zeolite, was obtained in the same manner as Example 3, excepting that aluminum-removing treatment was not conducted for the zeolite particles.

<Evaluation>

The change in CO purification ratios of the catalysts Example 3 and Comparative Example 3 were evaluated in the same manner as Example 1 and Comparative Example 1.

For both of the catalysts pretreated under stoichiometric atmosphere and the catalysts pretreated under oxygen atmosphere, the differences between CO 50% purification temperatures of the catalysts of Comparative Example 3 and Example 3 are shown in FIG. 1.

As shown in FIG. 1, the iron-cluster supporting aluminum-removed zeolite catalyst of Example 3 had a remarkably better low-temperature catalyst activity than the iron-cluster supporting (non-aluminum-removed) zeolite catalyst of Comparative Example 3.

Example 4 and Comparative Example 4 (Copper Cluster-Supporting Catalyst)

Example 4

The catalyst of Example 4, in which copper clusters were supported on aluminum-removed zeolite particles, was obtained in the same manner as Example 1, excepting that MFI-type zeolite particles (silica/alumina ratio (SAR):23.8) were used in place of MFI-type zeolite particles.

The SAR of the obtained aluminum-removed MFI-type zeolite particles was 25.8 according to ICP-OES, meaning that the ratio of aluminum atom removed from the skeleton of the zeolite by the aluminum-removing treatment was about 8%.

Comparative Example 4

The catalyst of Comparative Example 4, in which copper clusters were supported on zeolite particles, was obtained in the same manner as Example 4, excepting that aluminum-removing treatment was not conducted for the zeolite particles.

<Evaluation>

The change in CO purification ratios of the catalysts Example 4 and Comparative Example 4 were evaluated in the same manner as Example 1 and Comparative Example 1. The CO purification ratio at the temperature of 800° C. was shown below.

TABLE 1

| | Aluminum-removing ratio (%) | CO Purification Ratio (%) | |
|---|---|---|---|
| | | Stoichiometric Pretreated | Oxygen Pretreated |
| Comparative Example 4 | 0 | 12.8 | 8.4 |
| Example 4 | 8 | 24.7 | 14.4 |

As shown in Table 1, the copper-cluster supporting aluminum-removed zeolite catalyst of Example 4 had a better low-temperature catalyst activity than the copper-cluster supporting (non-aluminum-removed) zeolite catalyst of Comparative Example 4. However, the ratio of aluminum atom removed of the aluminum-removed zeolite particles of Example 4 was as low as 8%, and therefore the improvement of the catalyst of Example 4 using aluminum-removed zeolite particles was not remarkable in comparison with the catalyst of Comparative Example 4 using (non-aluminum-removed) zeolite particles.

Experiment 5 (Boron-Removing Treatment of Boron-Substituted Zeolite)

Experiment 5-1 (Ion Exchange)

Boron atoms were removed from the skeleton of boron-substituted zeolite (B-MFI) by a boron-removing treatment in which the following operations were repeated three times: the boron-substituted zeolite was added to $RhCl_3$ aqueous solution (10 mM), the obtained solution was stirred for a whole day and night at a room temperature, and then the resulted solution was filtered.

The SBR (silica/boron ratio) of the zeolite before the treatment was 38, while the SBR of the zeolite after the treatment was 736. This means that the ratio of boron atom removed from the skeleton of the zeolite by the boron-removing treatment was about 95%.

Experiment 5-2 (Solution Reduction Method)

Boron atoms were removed from the skeleton of boron-substituted zeolite (B-CHA) by a boron-removing treatment in which the boron-substituted zeolite was added to $RhCl_3$ 2-propanol solution (15 mM), 2-propanol solution of $NaBH_4$ (6.5 times of $RhCl_3$) was added the 2-propanol solution containing the boron-substituted zeolite, and then the resulting solution was stirred for 2.5 hours.

The SBR (silica/boron ratio) of the zeolite before the treatment was 34, while the SBR of the zeolite after the treatment was 47. This means that the ratio of boron atom removed from the skeleton of the zeolite by the boron-removing treatment was about 28%.

Experiment 5-3 (Metal Rinsing Method)

Boron atoms were removed from the skeleton of boron-substituted zeolite by a boron-removing treatment in which the boron-removed zeolite particles obtained in Experiment 5-2 were sintered, the sintered zeolite particles were added to 1M NaCl aqueous solution, stirred for 2 days at 80° C., and then vacuum filtered, and the obtained zeolite was added to an aqueous solution containing Tween20 (Tokyo Chemical Industry Co., Ltd., polyoxyethylene sorbitan monolaurate), $EDTA_3Na$, and $NaBH_4$, and then stirred for 10 days at 80° C.

The SBR (silica/boron ratio) of the zeolite before the treatment was 47, while the SBR of the zeolite after the treatment was 460. This means that the ratio of boron atom removed from the skeleton of the zeolite by the boron-removing treatment was about 90%.

Reference Example and Reference Comparative Example

In the following Reference Example and Comparative Reference Examples, which corresponds to Examples and Comparative Examples of Patent Document 4 above, it is shown that metal clusters can be supported in the pore of the zeolite particles by the method of the present invention, and that the thus produced catalyst supporting catalyst metal cluster in the pores thereof exhibit superior exhaust gas purifying activity.

Reference Examples 1 and 2 and Reference Comparative Example 1

In Reference Examples 1 and 2 and Reference Comparative Example 1, gold clusters were formed by a laser ablation method of gold target in acetone, and the gold clusters were supported on carrier particle to prepare a supported gold-cluster catalyst. The catalysts obtained in Reference Examples 1 and 2 and Reference Comparative Example 1 were evaluated for the fluorescence spectrum.

Reference Example 1

As illustrated in FIG. 2A, acetone 11 as a dispersion medium having dispersed therein carrier particles (not shown) was put in a vessel 13, a plate 12 of gold was placed in acetone 11, the plate 12 of gold in acetone 11 was irradiated with a laser 15 through a lens 14, and a gold cluster 16 was formed in the acetone by laser ablation. The thus-formed gold cluster 16 took on a positive charge and therefore, as illustrated in FIG. 2B, was electrically drawn to sites having a negative charge, i.e., acid sites, of the carrier particles of zeolite carrier particles 20, and supported there.

The laser light was the basic wave (1,064 nm, 10 Hz) of a Nd:YAG laser, and the intensity thereof was 2 W.

The carrier particles supporting the clusters were taken out from the acetone, dried at about 25° C. for about 1 hour, and fired at 300° C. for 2 hours to obtain the supported gold-cluster catalyst of Reference Example 1.

In Reference Example 1, the carrier particles and the laser irradiation time were as follows:
Carrier particle: ZSM-5 zeolite (MFI) (Si/Al ratio: 1,500)
Laser irradiation time: 2 hours and 45 minutes Reference Example 2

The supported gold-cluster catalyst of Reference Example 2 was obtained in the same manner as in Reference Example 1 except that the carrier particles and the laser irradiation time were as follows:
Carrier particle: ZSM-5 zeolite (MFI) (Si/Al ratio: 1,500)
Laser irradiation time: 12 hours and 30 minutes Incidentally, since the ablation efficiency differs depending on the surface state of the carrier particles or the plate of gold, in Reference Example 2 and Reference Comparative Example 1, the laser ablation time was adjusted to provide the same amount of ablation of gold as in Reference Example 1. The amount of ablation of gold was judged from the change in color of the dispersion medium.

Reference Comparative Example 1

The supported gold-cluster catalyst of Reference Comparative Example 1 was obtained in the same manner as in Reference Example 1 except that the carrier particles and the laser irradiation time were as follows:
Carrier particle: fumed silica
Laser irradiation time: 30 minutes
<Evaluation: Fluorescence Spectrum>

Figure 3A:
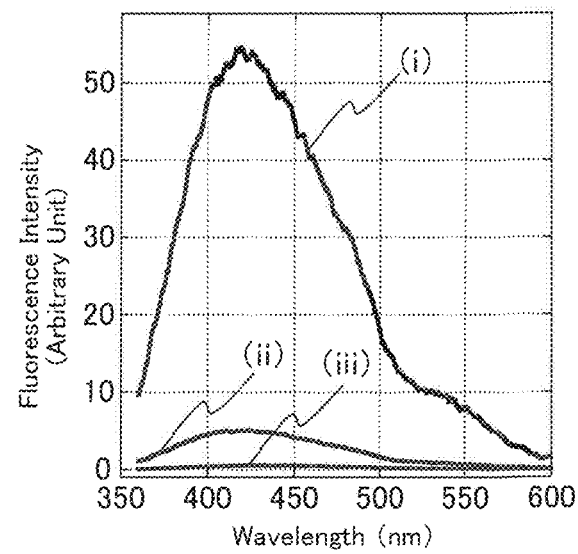
FIGS. 3 A and B are graphs illustrating the fluorescence spectra with respect to the supported gold-cluster catalysts of Reference Examples 1 and 2 and Reference Comparative Example 1.

With respect to the supported gold-cluster catalysts of Reference Examples 1 and 2 and Reference Comparative Example 1, the measurement of fluorescence spectrum (excitation wavelength: 350 nm) was performed. FIG. 3A depicts a graph illustrating the evaluation results of fluorescence spectrum normalized to the intensity per 1 mg of gold. In FIG. 3A, the result as to Reference Example 1 is indicated by the spectrum (i), the result as to Reference Example 2 is indicated by the spectrum (ii), and the result as to Reference Comparative Example 1 is indicated by the spectrum (iii).

In FIG. 3A, the fluorescence signal at near 400 nm is a spectrum in which fluorescent emissions from the gold cluster of about 8-mer were overlapped. Accordingly, FIG. 3A indicates that in the supported gold-cluster catalysts of Reference Examples 1 and 2, particularly, in the supported gold-cluster catalyst of Reference Example 1, a relatively large amount of a gold cluster around 8-mer is supported on the carrier particle.

Figure 3B:
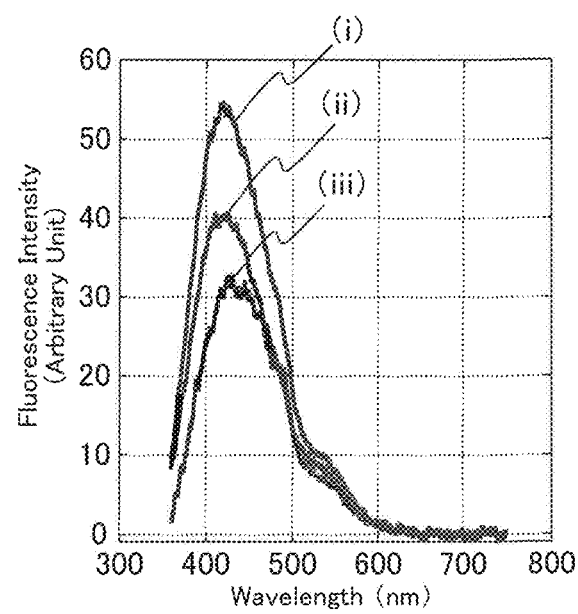

In FIG. 3B, for the sake of examination, based on the spectra of FIG. 3A, the result as to Reference Example 1 (spectrum (i)) is depicted at 1-fold magnification, the result as to Reference Example 2 (spectrum (ii)) is depicted at 8-fold magnification, and the result as to Reference Comparative Example 1 (spectrum (iii)) is depicted at 60-fold magnification.

Compared with the results (spectra (i) and (ii)) as to Reference Examples 1 and 2 where the gold clusters were supported on zeolite, the result (spectrum (iii)) as to Reference Comparative Example 1 where the gold clusters were supported on fumed silica is shifted to the long wavelength side. Thus suggests that the particle diameter of the gold cluster supported on fumed silica of Reference Comparative Example 1 is larger than that of the gold cluster supported on zeolite of Reference Examples 1 and 2. Incidentally, the peak near 550 nm is derived from Mie scattering by nanoparticles attached to the carrier particle surface simultaneously with the clusters.

<Other Metals>

In Reference Examples 1 to 2 and Reference Comparative Example 1, a gold clusters were formed by using a gold target. In this connection, as to the following metals, it was confirmed that clusters of the metal can be formed in the same manner as in Reference Example 1 by the method of laser ablation in liquid using the metal as the target:

Aluminum, silicon, titanium vanadium, chromium, manganese, iron, cobalt, nickel, copper, zinc, gallium, germanium zirconium niobium, silver, rhodium ruthenium, palladium, indium, tin, tantalum, tungsten, iridium, platinum, and cerium.

It was also confirmed that out of these metal clusters, as to copper, silver, rhodium, ruthenium palladium and platinum, fluorescence is observed upon irradiation with excitation light. In addition, it was confirmed that out of these metal clusters, as to copper, silver, rhodium, ruthenium and platinum, fluorescence is observed upon irradiation with excitation light also when clusters formed by the ion exchange-reduction method are supported on a zeolite carrier particle.

Reference Example 3

In Reference Example 3, a supported copper-cluster catalyst in which copper clusters are supported on a zeolite carrier particles was prepared in the same manner as in Reference Example 1 except that a copper target was used in place of the gold target and a ZSM-5 zeolite carrier particles (MFI) (Si/Al ratio: 40) were used as the zeolite carrier particle. The obtained catalyst was evaluated for the fluorescence spectrum.

Unlike the gold, the copper is oxidized in air, and the copper cluster immediately after preparation was in the oxide state. Accordingly, the supported copper-cluster catalyst immediately after preparation did not emit fluorescence.

Figure 4:
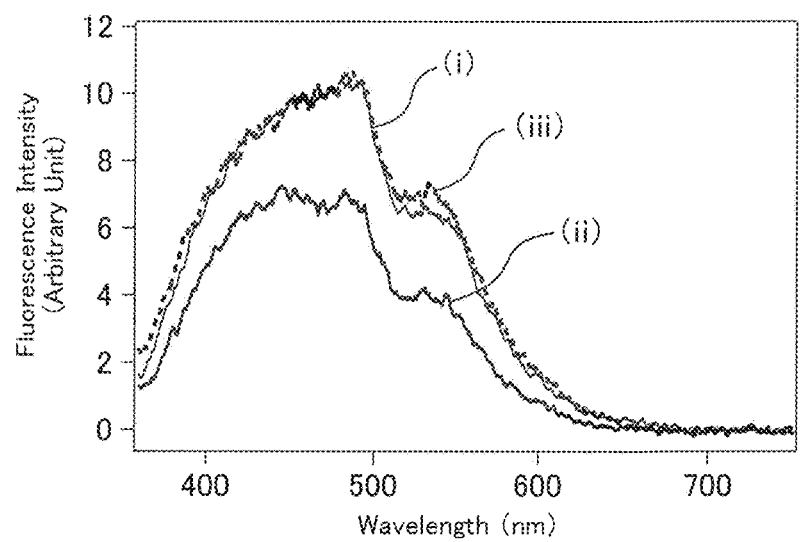
FIG. 4 is a graph illustrating the fluorescence spectra before oxidation treatment and reduction treatment with respect to the supported copper-cluster catalyst of Reference Example 3.

Then, the obtained supported copper-cluster catalyst was heated at 300° C. for 2 hours in a hydrogen atmosphere, effecting a reduction treatment, and thereafter evaluated for the fluorescence intensity. Consequently, the supported copper-cluster catalyst subjected to a reduction treatment exhibited fluorescence. The result of the fluorescence intensity evaluation (excitation wavelength: 350 nm) is illustrated as the spectrum (i) in FIG. 4. In this spectrum (i), the fluorescence of 400 to 500 nm corresponds to the already-reported fluorescence signals of 8-mer and 9-mer of copper.

Subsequently, the supported copper-cluster catalyst was left standing overnight in an air atmosphere, effecting an oxidation treatment, and again evaluated for the fluorescence intensity. Consequently, the supported copper-cluster catalyst left standing in an air atmosphere exhibited fluorescence, though the intensity was weak compared with that before the treatment in an air atmosphere. The result of fluorescence intensity evaluation is illustrated as the spectrum (ii) in FIG. 4.

Subsequently, the supported copper-cluster catalyst left standing in an air atmosphere was again subjected to the above-described reduction treatment and again evaluated for the fluorescence intensity. Consequently, the supported copper-cluster catalyst again subjected to the reduction treatment exhibited the same fluorescence as that before the treatment in an air atmosphere. The result of the fluorescence intensity evaluation is illustrated as the spectrum (iii) in FIG. 4.

The supported copper-cluster catalyst after performing oxidation treatment and reduction treatment thus exhibited the same fluorescence as that before these treatments, and this suggests that the copper clusters are held within the pores of the zeolite carrier particles and in turn, a change such as aggregation of the copper clusters are not caused by these treatments.

Reference Example 4 and Reference Comparative Example 2

In Reference Example 4 and Reference Comparative Example 2, the rhodium cluster-supporting catalyst (Reference Example 4) and a commercially available exhaust gas purification catalyst (Reference Comparative Example 2) were evaluated for the catalytic activity.

Specifically, Reference Example 4 and Reference Comparative Example 2 were conducted as follows.

Reference Example 4

In Reference Example 4, rhodium clusters were supported on a zeolite carrier particles in the same manner as in Reference Example 1 except that a rhodium target was used in place of the gold target and a beta-type zeolite carrier particles (BEA) (Si/Al ratio: 40) were used as the zeolite carrier particle.

The temperature ($T_{CO(50\%)}$) when consuming 50% of the supplied carbon monoxide was evaluated by repeating an operation of heating 30 mg of the obtained rhodium cluster-supporting catalyst ($Rh_{cluster}$/BEA) for about 24 hours in an electric furnace at a heating rate of 12° C./min to a peak heating temperature of 640 to 800° C. from room temperature while flowing an evaluation gas having the following composition over the catalyst, and cooling it to room temperature.

Carbon monoxide (CO): 0.3%
Oxygen ($O_2$): 8%
Helium (He): balance

Figure 5:
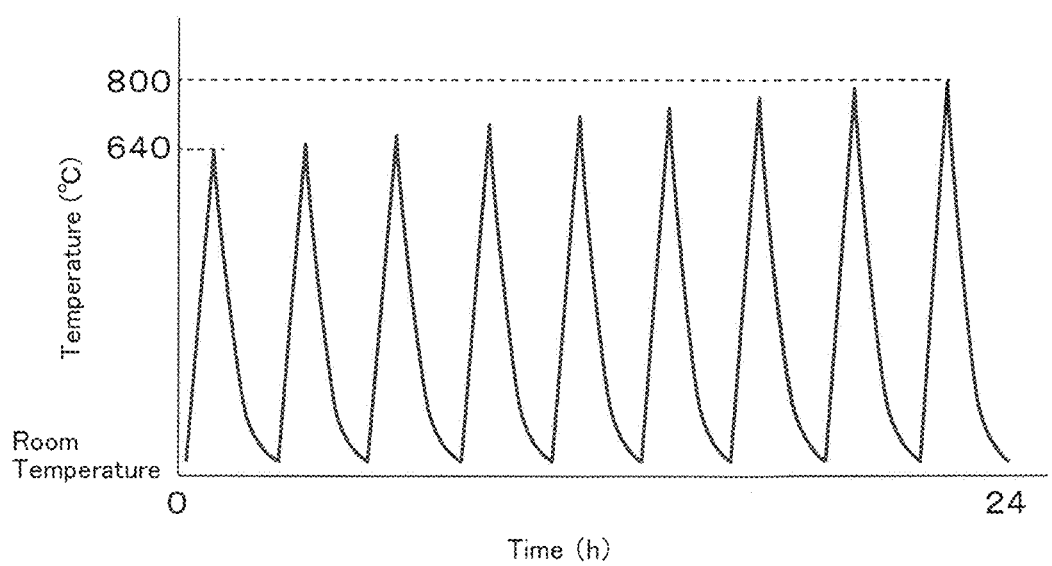
FIG. 5 is a graph illustrating the temperature change for the evaluation of catalytic activity.

With respect to the temperature change in the above-described repetitive step of heating and cooling, as illustrated in FIG. 5, the peak heating temperature becomes higher as it goes to the latter half, and a total of about 24 hours was spent.

In the repetitive step of heating and cooling, the evaluation was performed while raising the evaluation gas temperature to the peak heating temperature, i.e., in the temperature rising process. Similarly, in the repetitive step of heating and cooling, the evaluation was performed while lowering the evaluation gas temperature from the peak heating temperature, i.e., in the temperature dropping process.

Reference Comparative Example 2

For reference, with respect to a commercially available exhaust gas purification catalyst ($Rh/Al_2O_3$—$CeO_2$—$ZrO_2$) as Reference Comparative Example 2, the evaluations in the temperature rising process and the temperature dropping process were performed in the same manner as in Reference Example 4.

<Evaluation: Durability>

Figure 6A:
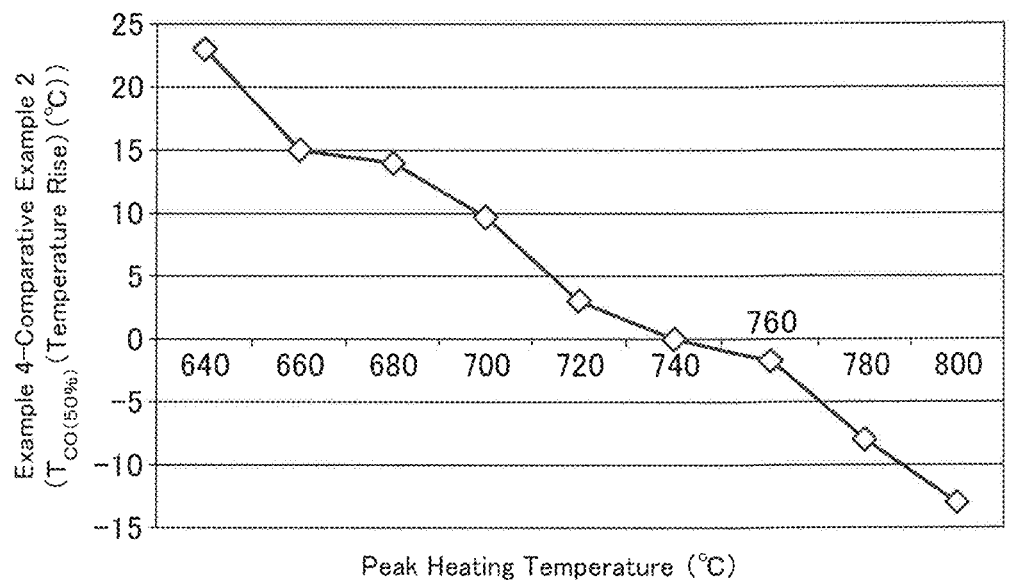
FIG. 6A is the results of the temperature rising process and FIG. 6B is the results of the temperature dropping process.
Figure 6B:
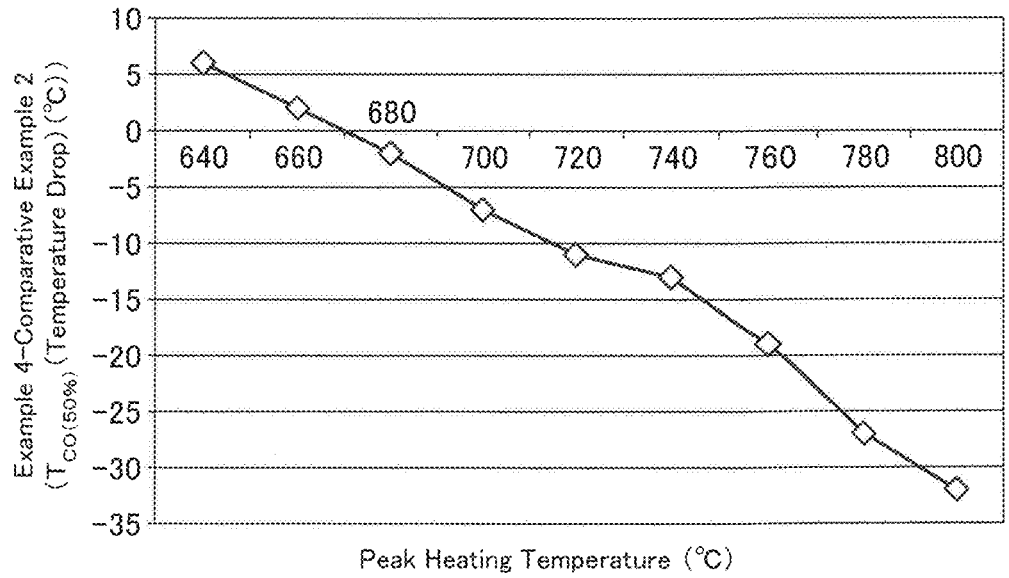

The evaluation results in the temperature rising process and the temperature dropping process are illustrated respectively in FIGS. 6A and 6B as the difference between the result of Reference Example 4 and the result of Reference Comparative Example 2 ($T_{CO(50\%)}$ of Reference Example 4)-($T_{CO(50\%)}$ of Reference Comparative Example 2). When the difference above takes a minus value, this indicates that $T_{CO(50\%)}$ of Reference Example 4 is lower than $T_{CO(50\%)}$ of Reference Comparative Example 2, i.e., the low-temperature activity of the catalyst of Reference Example 4 is excellent. In FIG. 6, the abscissa indicates the temperature (the peak temperature in FIG. 5) at which an accelerated deterioration treatment was performed.

It is understood from FIGS. 6A and 6B that the catalyst of Reference Example 4 provides an excellent exhaust gas purification performance relative to the catalyst of Reference Comparative Example 2 as the peak heating temperature becomes higher. This indicates that the catalyst of Reference Example 4 is less likely to deteriorate compared with the catalyst of Reference Comparative Example 2.

Although not to be bound by theory, it is considered that in the catalyst of Reference Comparative Example 2, rhodium of various sizes ranging from the monoatomic level to the submicrometer level was supported on the carrier to randomly cause sintering of rhodium particles by heat at the peak heating temperature and the catalyst was thereby deteriorated, whereas in the catalyst of Reference Example 4, rhodium clusters were stably maintained within the pores of zeolite and in turn, the catalyst was not deteriorated due to heat at the peak heating temperature.

Incidentally, the change when the peak heating temperature is 640° C. and 660° C. is a change in the firing process of removing water molecules adsorbed to zeolite and therefore, the catalytic activity needs to be evaluated from the change substantially when the peak heating temperature is 700° C. or more.

Reference Example 5 and Reference Comparative Example 3

In Reference Example 5 and Reference Comparative Example 3, a catalyst in which rhodium clusters are supported on zeolite carrier particles or fumed silica carrier particles was obtained, and with respect to the obtained catalysts, the durability of the catalyst was evaluated.

Specifically, Reference Example 5 and Reference Comparative Example 3 were conducted as follows.

Reference Example 5

In Reference Example 5, rhodium clusters were supported on zeolite carrier particles in the same manner as in Reference Example 1 except that a rhodium target was used in place of the gold target and beta-type zeolite carrier particles (BEA) (Si/Al ratio: 40) were used as the zeolite carrier particle.

With respect to the obtained rhodium cluster-supporting catalyst ($Rh_{cluster}$/BEA), the temperature ($T_{CO(50\%)}$) when consuming 50% of the supplied carbon monoxide was evaluated in the temperature rising process and in the temperature dropping process in the same manner as in Reference Example 4.

Reference Comparative Example 3

In Reference Comparative Example 3, rhodium clusters were supported on a fumed silica particle in the same manner as in Reference Example 1 except that a rhodium target was used in place of the gold target and a fumed silica particle was used as the carrier particle.

With respect to this rhodium cluster-supporting catalyst ($Rh_{cluster}$/silica), the temperature ($T_{CO(50\%)}$) when consuming 50% of the supplied carbon monoxide was evaluated in the temperature rising process and in the temperature dropping process in the same manner as in Reference Example 4.

<Evaluation: Durability>

Figure 7A:
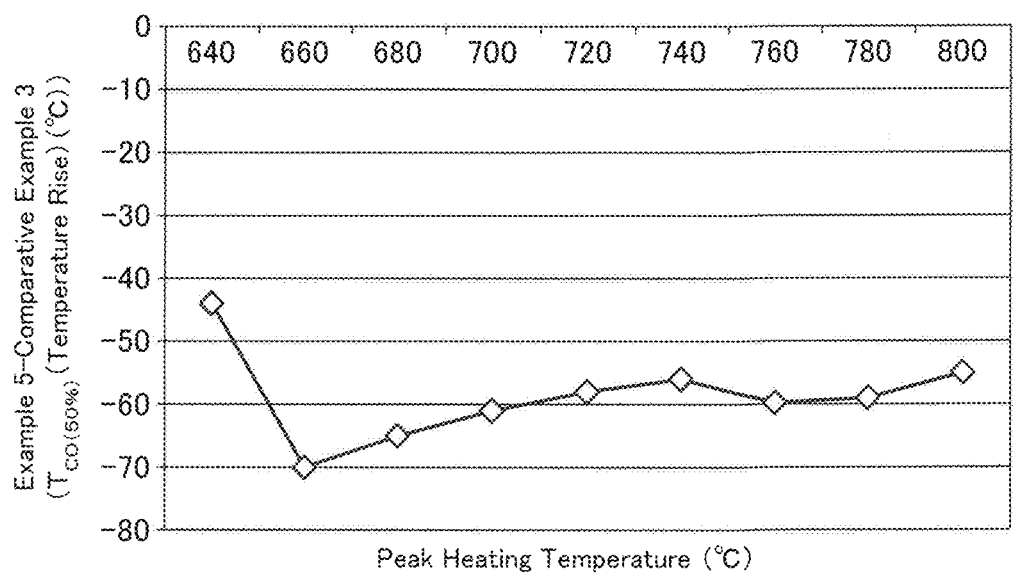
FIG. 7A is the results of the temperature rising process and FIG. 7B is the results of the temperature dropping process.
Figure 7B:
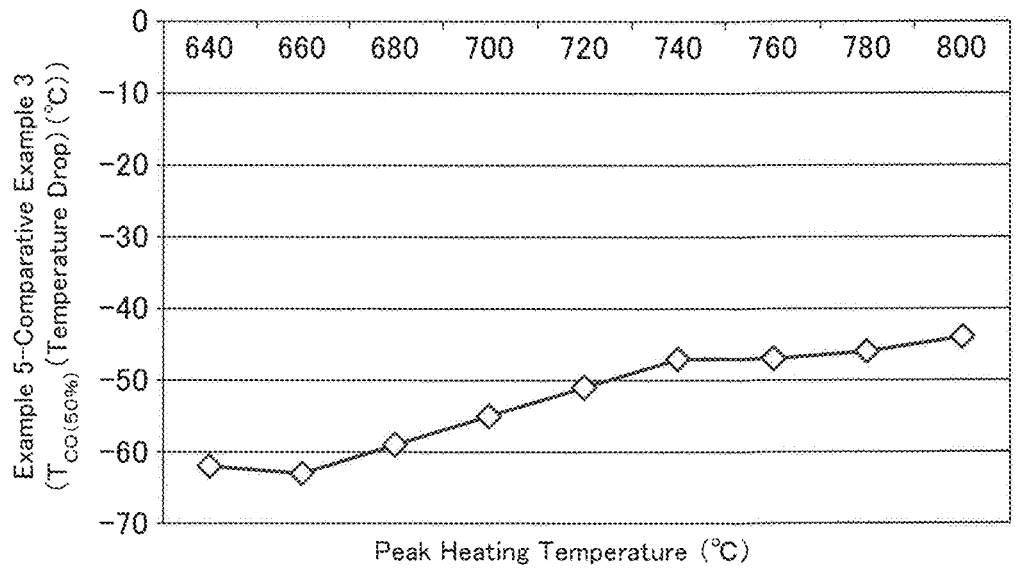

The evaluation results in the temperature rising process and the temperature dropping process are illustrated respectively in FIGS. 7A and 7B as the difference between the result of Reference Example 5 and the result of Reference Comparative Example 3 ($T_{CO(50\%)}$ of Reference Example 5)-($T_{CO(50\%)}$ of Reference Comparative Example 3). When the difference above takes a minus value, this indicates that $T_{CO(50\%)}$ of Reference Example 5 is lower than $T_{CO(50\%)}$ of Reference Comparative Example 3, i.e., the low-temperature activity of the catalyst of Reference Example 5 is excellent. In FIG. 7, the abscissa indicates the temperature (the peak temperature in FIG. 5) at which an accelerated deterioration treatment was performed.

It is understood from FIGS. 7A and 7B that the catalyst ($Rh_{cluster}$/BEA) of Reference Example 5 in which rhodium clusters are supported on beta-type zeolite carrier particles (BEA) has a significantly excellent low-temperature activity at all peak heating temperatures, compared with the catalyst ($Rh_{cluster}$/silica) of Reference Comparative Example 3 in which rhodium clusters are supported on a fumed silica carrier particle.

Although not to be bound by theory, this is considered to be attributable to the fact that since fumed silica used in the catalyst of Reference Comparative Example 3 does not have a pore, the rhodium clusters were supported only on the surface thereof and in the process of the rhodium being supported on the carrier and/or during the accelerated deterioration treatment, the rhodium cluster underwent aggregation or grain growth, i.e., the fact that while the rhodium cluster of the catalyst of Reference Example 5 is stably maintained within the pores of the zeolite carrier, the rhodium cluster of the catalyst of Reference Comparative Example 3 is present on the outer surface of the fumed silica carrier.

Reference Example 6 and Reference Comparative Example 4

In Reference Example 6 and Reference Comparative Example 4, a catalyst was obtained by supporting or not supporting a rhodium cluster on zeolite carrier particles, and the obtained catalysts were evaluated for the durability.

Specifically, Reference Example 6 and Reference Comparative Example 4 were conducted as follows.

Reference Example 6

In Reference Example 6, rhodium clusters were supported on zeolite carrier particles in the same manner as in Reference Example 1 except that a rhodium target was used in place of the gold target and ZSM-5 zeolite carrier particles (MFI) (Si/Al ratio:40) were used as the zeolite carrier particle.

With respect to the obtained rhodium cluster-supporting catalyst ($Rh_{cluster}$/MFI), the temperature ($T_{CO(50\%)}$) when consuming 50% of the supplied carbon monoxide was evaluated in the temperature rising process and in the temperature dropping process in the same manner as in Reference Example 4.

Reference Comparative Example 4

In Reference Comparative Example 4, rhodium clusters were dispersed in acetone in the same manner as in Reference Example 1 except that a rhodium target was used in place of the gold target and carrier particles was not used. Thereafter, at the stage where the rhodium clusters were aggregated to form a rhodium cluster aggregate particles, ZSM-5 zeolite carrier particles (MFI) (Si/Al ratio: 40) was added as the zeolite carrier particles to the acetone to prepare the catalyst ($Rh_{particle}$/MFI) of Reference Comparative Example 4 in which the rhodium cluster aggregate particle was supported on the ZSM-5 zeolite carrier particles (MFI).

With respect to this rhodium aggregate particle-supported catalyst ($Rh_{particle}$/MFI), the temperature ($T_{CO(50\%)}$) when consuming 50% of the supplied carbon monoxide was evaluated in the temperature rising process and in the temperature dropping process in the same manner as in Reference Example 4.

<Evaluation: Durability>

Figure 8A:
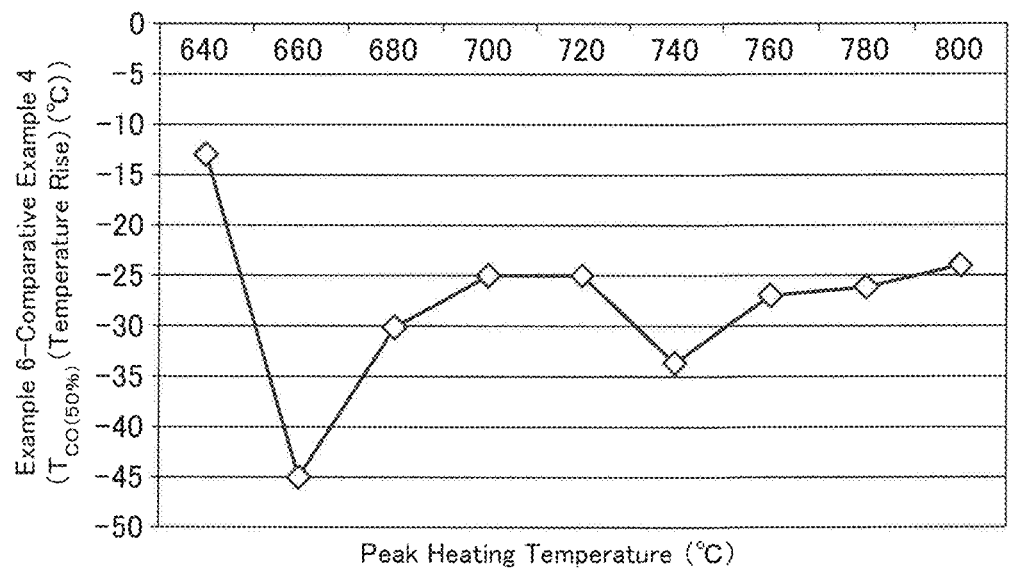
FIG. 8A is the results of the temperature rising process and FIG. 8B is the results of the temperature dropping process.
Figure 8B:
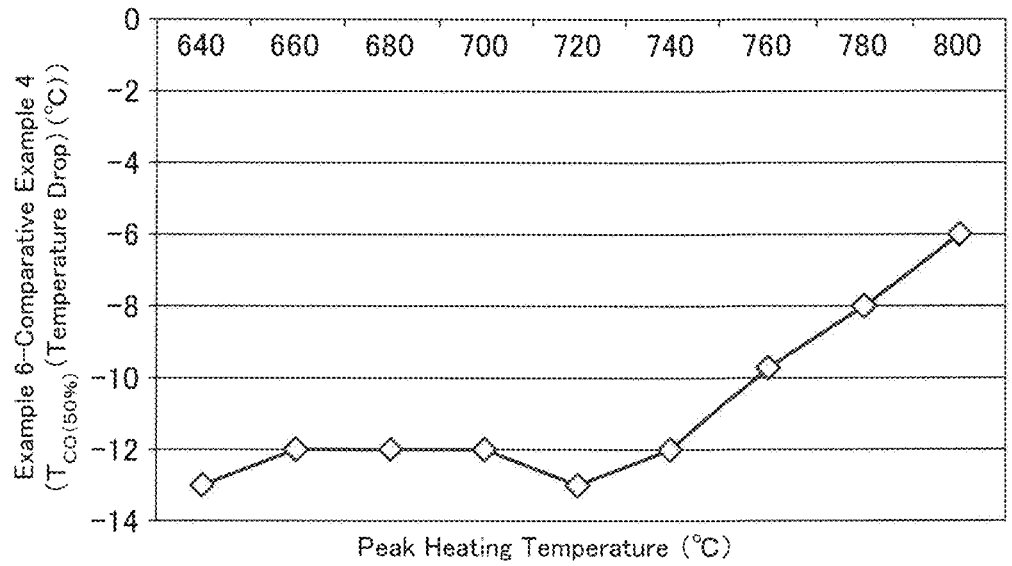

The evaluation results in the temperature rising process and the temperature dropping process are illustrated respectively in FIGS. 8A and 8B as the difference between the result of Reference Example 6 and the result of Reference Comparative Example 4 ($T_{CO(50\%)}$ of Reference Example 6)-($T_{CO(50\%)}$ of Reference Comparative Example 4). When the difference above takes a minus value, this indicates that $T_{CO(50\%)}$ of Reference Example 6 is lower than $T_{CO(50\%)}$ of Reference Comparative Example 4, i.e., the low-temperature activity of the catalyst of Reference Example 6 is excellent. In FIG. 8, the abscissa indicates the temperature (the peak temperature in FIG. 5) at which an accelerated deterioration treatment was performed.

It is understood from FIGS. 8A and 8B that the catalyst ($Rh_{cluster}$/MFI) of Reference Example 6 in which rhodium clusters are supported on a ZSM-5 zeolite carrier particles (MFI) has a significantly excellent low-temperature activity at all peak heating temperatures, compared with the catalyst ($Rh_{particle}$/MFI) of Reference Comparative Example 4 in which a rhodium cluster aggregate particles are supported on a ZSM-5 zeolite carrier particles (MFI).

Although not to be bound by theory, this is considered to be attributable to the fact that since the particle diameter of the rhodium cluster used in the catalyst of Reference Example 6 is significantly smaller than the particle diameter of the rhodium cluster aggregate particle used in the catalyst of Reference Comparative Example 4, a low-temperature catalytic activity specific to clusters was exhibited and a relatively large surface area could be provided for the catalytic reaction.

Reference Examples 7 to 10

In Reference Examples 7 to 10, a catalyst was obtained by supporting a rhodium cluster on zeolite carrier particles, and the obtained catalysts were evaluated for the durability.

Specifically, Reference Examples 7 to 10 were conducted as follows.

In Reference Examples 7 to 10, rhodium clusters were supported on zeolite carrier particles in the same manner as in Reference Example 1 except that a rhodium target was used in place of the gold target and the following carrier particles were used as the zeolite carrier particle.

Reference Example 7: ZSM-5 Zeolite Carrier Particles (MFI) (Si/Al Ratio: 1,500)

Reference Example 8: Beta-Type Zeolite Carrier Particles (BEA) (Si/Al Ratio: 1,500)

Reference Example 9: Beta-Type Zeolite Carrier Particles (BEA) (Si/Al Ratio: 40)

Reference Example 10: ZSM-5 Zeolite Carrier Particles (MFI) (Si/Al Ratio: 40)

With respect to the obtained rhodium cluster-supporting catalysts of Reference Examples 7 to 10, the temperature ($T_{CO(50\%)}$) when consuming 50% of the supplied carbon monoxide was evaluated in the temperature rising process and in the temperature dropping process in the same manner as in Reference Example 4.

<Evaluation: Durability>

The evaluation results in the temperature rising process and the temperature dropping process are illustrated respectively in FIGS. 9A and 9B as the difference between the results of Reference Examples 7 to 10 and the result of Reference Comparative Example 2 (commercially available exhaust gas purification catalyst) ($T_{CO(50\%)}$ of Reference Examples 7 to 10)-($T_{CO(50\%)}$ of Reference Comparative Example 2). When the difference above takes a minus value, this indicates that $T_{CO(50\%)}$ of Reference Examples 7 to 10 is lower than $T_{CO(50\%)}$ of Reference Comparative Example 2, i.e., the low-temperature activity of the catalysts of Reference Examples 7 to 10 is excellent. In FIG. 9, the abscissa indicates the temperature (the peak temperature in FIG. 5) at which an accelerated deterioration treatment was performed.

It is understood from FIGS. 9A and 9B that the catalysts of Reference Examples 7 to 10 provides an excellent or equivalent exhaust gas purification performance relative to the catalyst of Reference Comparative Example 2 as the peak heating temperature becomes higher. This indicates that the catalysts of Reference Examples 7 to 10 are less likely to deteriorate compared with the catalyst of Reference Comparative Example 2.

Although not to be bound by theory, this is considered to be attributable to the fact that in the catalyst of Reference Comparative Example 2, rhodium of various sizes ranging from the monoatomic level to the submicrometer level was supported on the carrier to randomly cause sintering of rhodium particles by heat at the peak heating temperature and the catalyst was thereby deteriorated, whereas in the catalysts of Reference Examples 7 to 10, rhodium clusters were stably maintained within the pores of zeolite and in turn, the catalyst was not deteriorated due to heat at the peak heating temperature.

Incidentally, the catalyst of Reference Example 7 showed a poor catalyst performance in the temperature range of up to 800° C. compared with the catalyst of Reference Comparative Example 2, but it is clearly understood from the curves of FIGS. 9A and 9B that when the accelerated deterioration treatment is further continued, the performance of the catalyst of Reference Example 7 surpasses the performance of the catalyst of Reference Comparative Example 2.

Reviewing Reference Examples 7 and 10 using a ZSM-5 zeolite carrier particles (MFI) as the carrier, the catalyst of Reference Example 10 using ZSM-5 zeolite carrier particles (MFI(40)) having an Si/Al ratio of 40 exhibited good catalyst performance, compared with the catalyst of Reference Example 7 using ZSM-5 zeolite carrier particles (MFI (1500)) having an Si/Al ratio of 1,500. This is considered to occur because the ZSM-5 zeolite carrier particles (MFI(40)) having an Si/Al ratio of 40 has a larger number of acid sites than the ZSM-5 zeolite carrier particles (MFI(1500)) having an Si/Al ratio of 1,500 and supporting of the rhodium cluster on the zeolite carrier particles was successfully performed by an electrostatic action.

Reviewing Reference Examples 8 and 9 using a beta-type zeolite as the carrier, similarly to the case of MFI zeolite, the catalyst of Reference Example 9 using a beta-type zeolite carrier particles (BEA(40)) having an Si/Al ratio of 40, i.e., a zeolite carrier particles having a relatively large number of acid sites exhibited good catalyst performance, compared with the catalyst of Reference Example 8 using beta-type zeolite carrier particles (BEA(1500)) having an Si/Al ratio of 1,500, i.e., zeolite carrier particles having a relatively small number of acid sites.

However, in the case of using beta-type zeolite carrier particles (BEA), the difference in the catalyst performance due to the different in the Si/Al ratio was not so large as in the case of using ZSM-5 zeolite carrier particles (MFI). This is considered to occur because the beta-type zeolite carrier particle (BEA) substantially has a large surface solid acid strength and the effect of the difference in the amount of acid sites was less likely to develop.

For reference, the zeta potential (indicator of solid acid strength) of the zeolite carrier particles used in Reference Examples 7 to 10 is as follows:

Reference Example 7: ZSM-5 Zeolite Carrier Particle (MFI(1500)): −72.7 mV

Reference Example 8: Beta-Type Zeolite Carrier Particle (BEA(1500)): −96.8 mV

Reference Example 9: Beta-Type Zeolite Carrier Particle (BEA(40)): −117 mV

Reference Example 10: ZSM-5 Zeolite Carrier Particle (MFI(40)): −87 mV

That is, it is considered that in the case of a beta-type zeolite carrier particle (BEA), despite a large Si/Al ratio, the zeolite potential was low and supporting of the rhodium cluster on the zeolite carrier particle was thereby successfully performed by an electrostatic action.

In order to confirm this understanding, a rhodium particle was supported on MFI(40) (zeta potential: −87 mV) and on MFI(1500) (zeta potential: −72.7 mV) by laser ablation in liquid, as a result, coloring of the carrier caused by the supporting of rhodium particle on the carrier particle occurred more prominently in MFI(40) than in MFI(1500).

It is understood from this result that in the case of MFI(40) having a relatively small zeta potential, i.e., relatively large acid strength, the rhodium particle was supported on the carrier particle in a relatively successful manner through an electrostatic interaction between the rhodium particle and acid sites of the carrier particle.

Reference Examples 11 and 12

In Reference Examples 11 and 12, a supported copper-cluster catalyst was obtained by a method of reduction in liquid, and the obtained catalysts were evaluated by means of fluorescence.

Reference Example 11

In Reference Example 11, a zeolite carrier particle was dispersed in 2-propanol to produce a zeolite carrier particle dispersion liquid, and copper(II) chloride as a copper ion source and sodium borohydride (NaBH$_4$) as a reducing agent were mixed with the dispersion liquid to synthesize a copper cluster in the dispersion liquid. The thus-synthesized copper cluster had a positive charge and was thereby electrically drawn to acid sites of the zeolite carrier particle and supported thereon.

Figure 10:
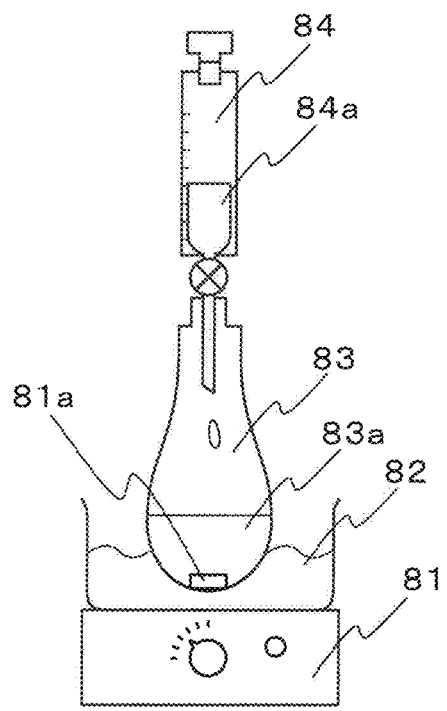
FIG. 10 is a diagrammatic view of the apparatus used in the preparation of clusters by a method of reduction in liquid.

Specifically, copper(II) chloride and sodium borohydride were mixed using the apparatus illustrated in FIG. 10.

More specifically, a water bath 82 at about 10° C. was disposed on a magnetic stirrer 81, a flask 83 was disposed thereon, a dropping funnel 84 was disposed on the flask 83, and the contents 84a of the dropping funnel 84 were added dropwise to the contents 83a of the flask 83 with stirring by means of a stirring bar 81a. The dropwise addition was performed for 1 hour while keeping the temperature by the water bath, and after the completion of dropwise addition, stirring was further performed for 1 hour while keeping the temperature by the water bath. Thereafter, stirring was further performed at room temperature for 2 hours, and the contents of the flask were then filtered and fired at a temperature of 300° C. for 2 hours in the atmosphere to obtain the supported copper-cluster catalyst of Reference Example 11.

The contents 84a of the dropping funnel 84 and the contents 83a of the flask 83 in Reference Example 11 are shown together in Table 1 below.

Reference Example 12

The supported copper-cluster catalyst of Reference Example 12 was obtained in the same manner as in Reference Example 11 except that the contents 84a of the dropping funnel 84 and the contents 83a of the flask 83 were changed as shown in Table 1 below.

TABLE 1

| | Reference Example 11 | | Reference Example 12 | |
|---|---|---|---|---|
| Dropping funnel | sodium borohydride | 25 µmol | copper chloride | 12 µmol |
| | 2-propanol | 10 mL | 2-propanol | 5 mL |
| Flask | copper chloride | 12 µmol | sodium borohydride | 80 µmol |

TABLE 1-continued

| | Reference Example 11 | | Reference Example 12 | |
|---|---|---|---|---|
| | zeolite carrier particle | 200 mg | zeolite carrier particle | 200 mg |
| | 2-propanol | 200 mL | 2-propanol | 200 mL |

<Evaluation: Fluorescence Spectrum>

The supported copper-cluster catalysts prepared in Reference Examples 11 and 12 and as reference samples, a copper ion-exchanged zeolite carrier particle and a proton-type zeolite carrier particle were measured for the fluorescence spectrum at an excitation wavelength of 350 nm. The results are illustrated in FIG. 11.

Figure 11:
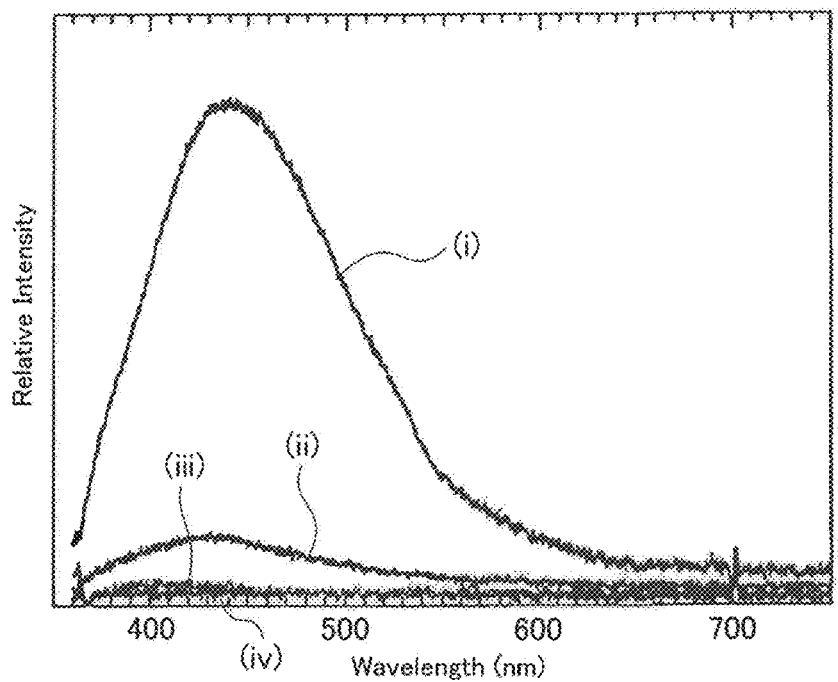
FIG. 11 is a graph illustrating the fluorescence spectra (excitation wavelength: 350 nm) with respect to samples prepared in Reference Examples 11 and 12 in which clusters are prepared by a method of reduction in liquid, and copper ion-exchanged zeolite carrier particles as a reference sample.

In FIG. 11, the result as to Reference Example 11 is indicated by the spectrum (i), the result as to Reference Example 12 is indicated by the spectrum (ii), the result as to the copper ion-exchanged zeolite carrier particle as a reference sample is indicated by the spectrum (iii), and the result as to the proton-type zeolite carrier particle as a reference sample is indicated by the spectrum (iv).

As understood from FIG. 11, the supported copper-cluster catalysts obtained in Reference Examples 11 and 12, particularly in Reference Example 11, showed a peak at about 440 nm. This peak is considered to be derived from the copper clusters. In the supported copper-cluster catalyst obtained in Reference Example 11, the peak above is as broad as having a half width of about 100 nm and is considered to be derived from the copper clusters.

<Evaluation: Fluorescence Spectrum>

In addition, the supported copper-cluster catalyst obtained in Reference Example 1 was measured for the fluorescence spectrum at an excitation wavelength of 350 nm and the excitation spectrum at a fluorescence monitor wavelength of 440 nm and 520 nm. The results are illustrated in FIG. 12.

Figure 12:
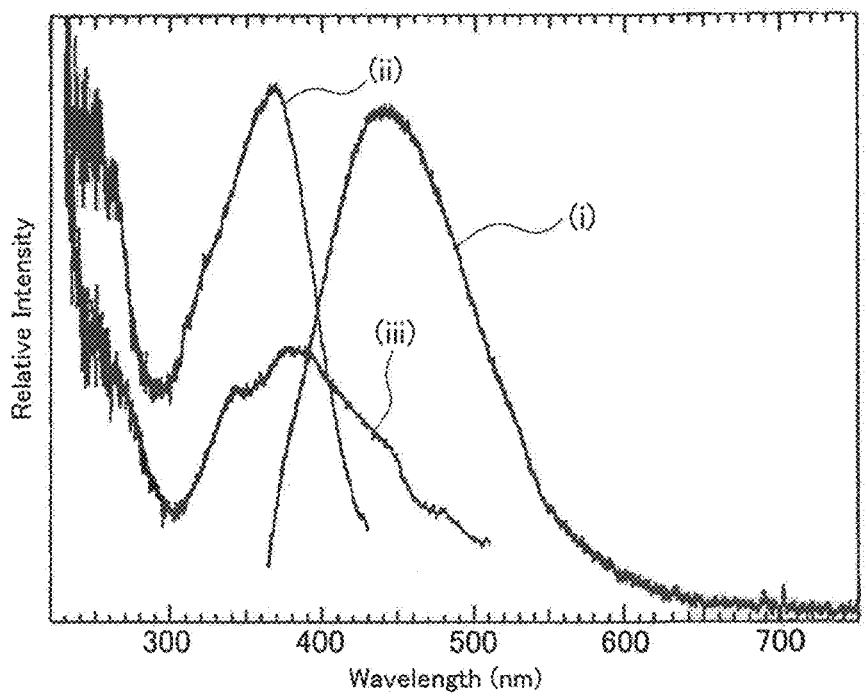
FIG. 12 is a graph illustrating the fluorescence spectrum (excitation wavelength: 350 nm) and the fluorescence spectra (fluorescence monitor wavelength: 440 nm, 520 nm) with respect to Reference Example 11 in which clusters are prepared by a method of reduction in liquid.

In FIG. 12, the result as to the excitation wavelength of 350 nm is indicated by the fluorescence spectrum (i), the result as to the fluorescence monitor wavelength of 440 nm is indicated by the spectrum (ii), and the result as to the fluorescence monitor wavelength of 520 nm is indicated by the spectrum (iii).

In FIG. 12, fluorescence specific to the copper clusters are observed, and it is therefore understood that the copper clusters are supported on the carrier particle.

Reference Example 13 and Reference Comparative Example 5

In Reference Example 13 and Reference Comparative Example 5, rhodium cluster-supporting catalysts were obtained by using a method of laser ablation in liquid and an ion exchange-reduction method, respectively.

Reference Example 13

In Reference Example 13, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle.

Reference Comparative Example 5

In Reference Comparative Example 5, a rhodium ion was supported on ZSM-5 zeolite carrier particles (Si/Al ratio: 40) by ion exchange, and then a metallic rhodium particle was supported on the zeolite carrier particle by reducing the rhodium ion, whereby rhodium clusters were supported on the zeolite carrier particle (ion exchange-reduction method). Rh(NO$_3$)$_3$ was used as a rhodium ion source and NaBH$_4$ was used as a reducing agent.

<Evaluation: Fluorescence Spectrum>

The supported catalysts of Reference Example 13 and Reference Comparative Example 5 were measured for the fluorescence spectrum (excitation wavelength: 350 nm). The evaluation results of fluorescence spectrum normalized to the intensity per 1 mg of rhodium are illustrated in FIG. 13.

Figure 13:
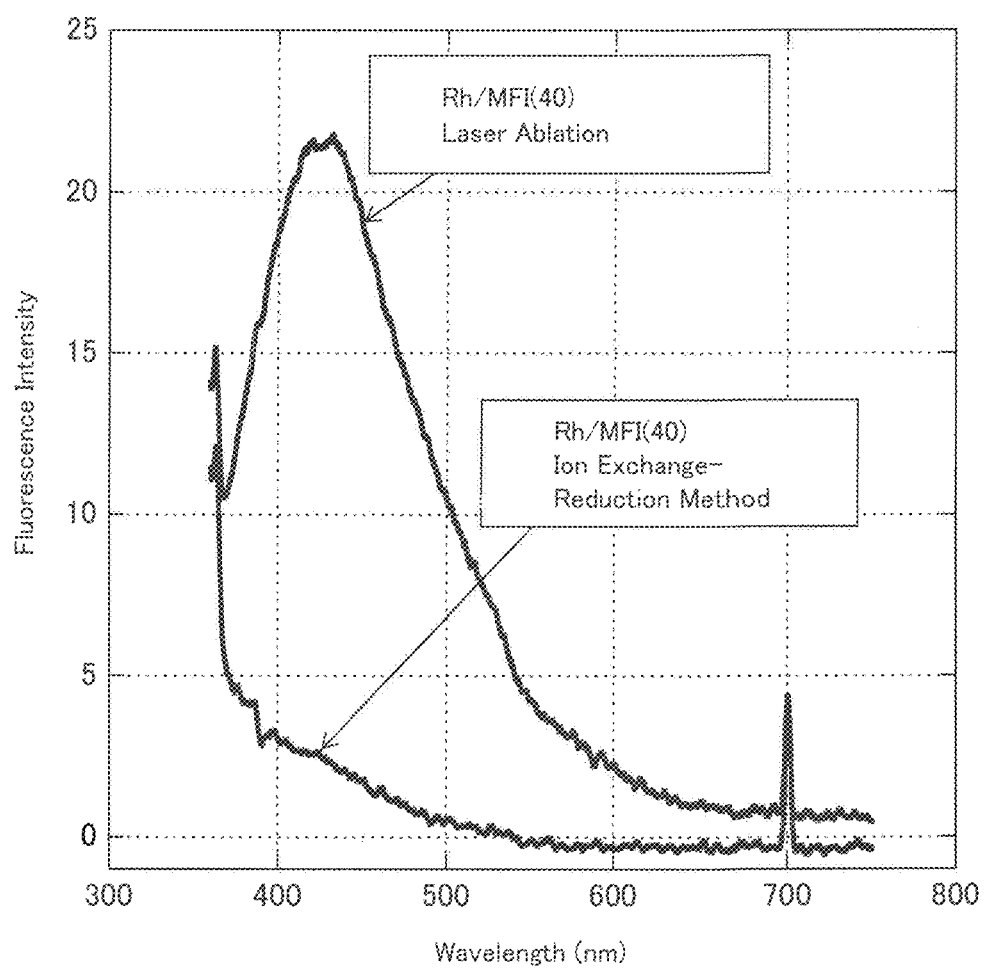
FIG. 13 is a graph illustrating the fluorescence spectra of the rhodium cluster-supporting catalysts of Reference Example 13 and Reference Comparative Example 5 prepared by a method of laser ablation in liquid and an ion exchange-reduction method, respectively.

It is understood from FIG. 13 that compared with Reference Comparative Example 5 using an ion exchange-reduction method, in Reference Example 13 using laser ablation in liquid, the fluorescence peak is large, i.e., a relatively large number of rhodium particles are supported in the cluster state on the zeolite carrier particle.

Reference Example 14 and Reference Comparative Example 6

In Reference Example 14 and Reference Comparative Example 6, supported gold-cluster catalysts were obtained by using a method of laser ablation in liquid and an ion exchange-reduction method, respectively.

Reference Example 14

In Reference Example 14, gold clusters were supported on a zeolite carrier particle by a method of laser ablation in liquid in the same manner as in Reference Example 1 except that ZSM-5 zeolite carrier particles (MFI) (Si/Al ratio: 1,500) were used as the zeolite carrier particle.

Reference Comparative Example 6

In Reference Comparative Example 6, a gold ion was supported on ZSM-5 zeolite carrier particles (MFI) (Si/Al ratio: 1,500) by ion exchange, and then gold clusters were supported on the zeolite carrier particle by reducing the gold ion (ion exchange-reduction method). Chloroauric acid (HAuCl$_4$) was used as a gold ion source and NaBH$_4$ was used as a reducing agent.

<Evaluation: Overall Composition Evaluation (ICP-OES)>

With respect to the supported catalysts of Reference Example 14 and Reference Comparative Example 6, the elemental composition of the supported catalyst as a whole was evaluated using inductively coupled plasma spectrometer (ICP-OES apparatus) (Agilent 5100 manufactured by Agilent Technologies, Inc. and SPS3000 manufactured by Hitachi High-Tech Science Corporation). The results are shown in Table 2 below.

<Evaluation: Surface Composition Evaluation (TEM-EDX)>

With respect to the supported catalysts of Reference Example 14 and Reference Comparative Example 6, the elemental composition of the supported catalyst surface was evaluated using a transmission electron microscope-energy dispersive X-ray spectroscopy (TEM-EDX) (JEM-2100F and JED-2300, manufactured by JEOL Ltd.). The results are shown in Table 2 below.

TABLE 2

|  |  | Reference Example 14 (Au laser ablation/ MFI(1500)) | Reference Comparative Example 6 (Au ion change-reduction/ MFI(1500)) |
| --- | --- | --- | --- |
| Whole (ICP-MASS) | Au (wt %) | 0.015 | 0.005 |
|  | Si (wt %) | 38 | 41 |
|  | Au/Si | 3.95 × 10$^{-4}$ | 1.22 × 10$^{-4}$ |
| Surface (TEM-EDX) | Au (wt %) | 0.46 | 0.44 |
|  | Si (wt %) | 66.94 | 59.82 |
|  | Au/Si | 6.87 × 10$^{-3}$ | 7.36 × 10$^{-3}$ |
| Heterogeneity index | (Au/Si (surface))/ (Au/Si (whole)) | 17.39 | 60.33 |

It is understood from Table 2 that in the supported catalyst of Reference Example 14 obtained by the method of laser ablation in liquid, compared with the supported catalyst of Reference Comparative Example 6 obtained by the ion exchange-reduction method, the ratio of the proportion of gold element in the whole to the proportion of gold element in the surface is small, i.e., the gold clusters are relatively uniformly dispersed in the supported catalyst.

Reference Example 15 and Reference Comparative Example 7

In Reference Example 15 and Reference Comparative Example 7, rhodium cluster-supporting catalysts were obtained by using a method of laser ablation in liquid and an ion exchange-reduction method, respectively.

Reference Example 15

In Reference Example 15, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Reference Comparative Example 7

In Reference Comparative Example 7, a rhodium ion was supported on ZSM-5 zeolite carrier particles (Si/Al ratio: 40) by ion exchange, and then a metallic rhodium particle was supported on the zeolite carrier particle by reducing the rhodium ion, whereby rhodium clusters were supported on the zeolite carrier particle (ion exchange-reduction method). Rh(NO$_3$)$_3$ was used as a rhodium ion source and NaBH$_4$ was used as a reducing agent. The amount of rhodium supported was 0.051 mass % relative to the zeolite carrier particle.

<Evaluation: H$_2$-TPR Test (Before Thermal Endurance)>

With respect to the supported catalysts of Reference Example 15 and Reference Comparative Example 7, a pretreatment was performed by adsorbing oxygen to the supported catalyst at 30° C. for 1 hour in a 100 vol % oxygen atmosphere and removing excess oxygen at 500° C. for 1 hour in a helium atmosphere.

With respect to the supported catalysts above subjected to the pretreatment, a test by hydrogen temperature-programmed reduction method (H$_2$-TPR) was performed by flowing a reducing gas containing 0.5 vol % of hydrogen and the balance helium at a spatial velocity of 10,000 h$^{-1}$ while raising the temperature at a rate of 10° C./min from 20° C.

Figure 14A:
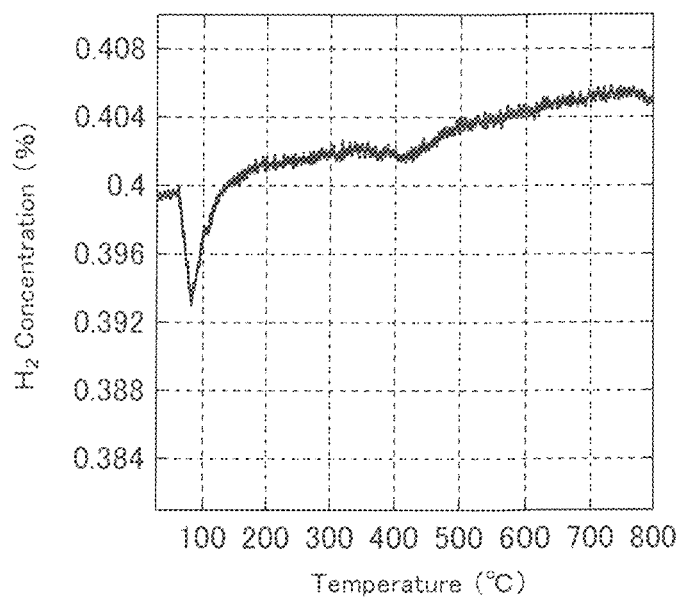
FIGS. 14 A and B are graphs illustrating the results of a test by hydrogen temperature-programmed reduction method ($H_2$-TPR) with respect to the rhodium cluster-supporting catalyst of Reference Example 15 prepared by a method of laser ablation in liquid.
Figure 15A:
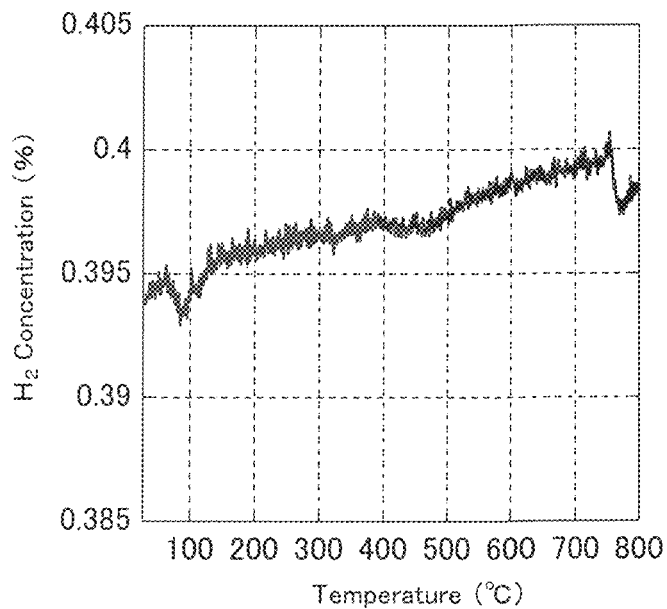
FIGS. 15 A and B are graphs illustrating the results of a $H_2$-TPR test with respect to the rhodium cluster-supporting catalyst of Reference Comparative Example 7 prepared by an ion exchange-reduction method.

The result as to the supported catalyst of Reference Example 15 is illustrated in FIG. 14A, and the result as to the supported catalyst of Reference Comparative Example 7 is illustrated in FIG. 15A. The peak/noise ratio of the peak of FIG. 14A was 35.7 (noise level: 0.000215%), and the peak/noise ratio of the peak of FIG. 15A was 5.12 (noise level: 0.000394%).

It is understood from these graphs that both of the supported catalysts of Reference Example 15 and Reference Comparative Example 7 have a relatively large peak of reaction between hydrogen supplied and oxygen adsorbed to the cluster-supporting catalyst, i.e., a peak with a peak/noise ratio of 2.0 or more, in the temperature range of 150° C. or less, i.e., have low-temperature activity.

<Evaluation: $H_2$-TPR Test (after Thermal Endurance)>

With respect to the supported catalysts of Reference Example 15 and Reference Comparative Example 7, a thermal endurance treatment was performed by subjecting the supported catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

With respect to the supported catalysts above subjected to the thermal endurance treatment, a pretreatment was performed as described above.

With respect to the supported catalysts above subjected to the pretreatment, a $H_2$-TPR test was performed as described above.

Figure 14B:
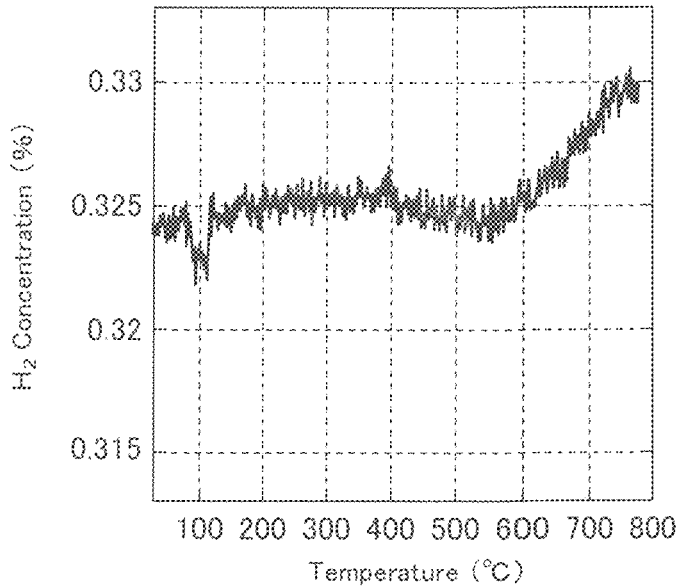
Figure 15B:
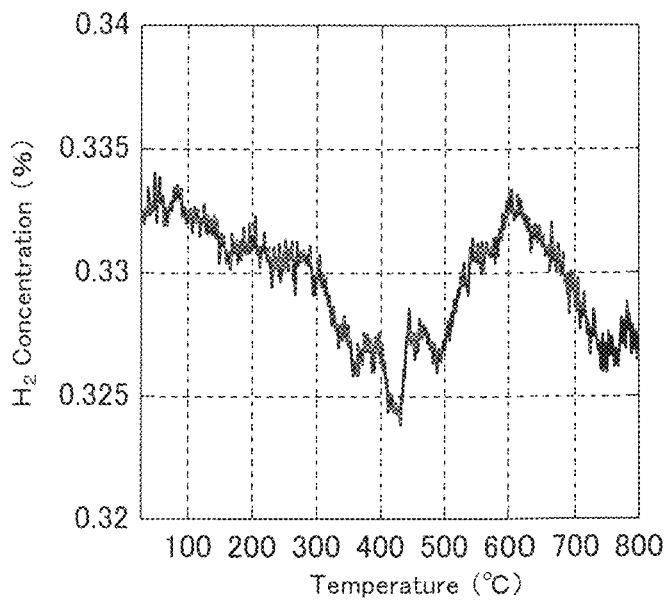

The result as to the supported catalyst of Reference Example 15 is illustrated in FIG. 14B, and the result as to the supported catalyst of Reference Comparative Example 7 is illustrated in FIG. 15B. The peak/noise ratio of the peak of FIG. 14B was 7.76 (noise level: 0.000326%), and the peak/noise ratio of the peak of FIG. 15B was 1.62 (noise level: 0.000377%).

It is understood from FIG. 14B that the supported catalyst of Reference Example 15 has a relatively large reaction peak in the temperature range of 150° C. or less, i.e., has low-temperature activity. In addition, it is understood from FIG. 15B that the supported catalyst of Reference Comparative Example 7 does not have a substantial peak in the temperature range of 150° C. or less, i.e., does not have a peak with a peak/noise ratio of 2.0 or more. In this way, the supported catalyst of Reference Comparative Example 7 does not have a substantial peak in the temperature range of 150° C. or less, and this means that the supported catalyst does not have low-temperature activity. That is, it is understood that in the supported catalyst of Reference Comparative Example 7 obtained by the ion exchange-reduction method, the dispersibility of the cluster particle was low and in turn, the heat resistance was poor.

Reference Example 16 and Reference Comparative Example 8

In Reference Example 16 and Reference Comparative Example 8, palladium cluster-supporting catalysts were obtained by using a method of laser ablation in liquid and an ion exchange-reduction method, respectively.

Reference Example 16

In Reference Example 16, palladium clusters were supported on a zeolite carrier particle by a method of laser ablation in liquid in the same manner as in Reference Example 1 except that a palladium target was used in place of the gold target and ZSM-5 zeolite carrier particles (Si/Al ratio: 40) were used as the zeolite carrier particle. The amount of palladium supported was 0.09 mass % relative to the zeolite carrier particle.

Reference Comparative Example 8

In Reference Comparative Example 8, a palladium ion was supported on ZSM-5 zeolite carrier particles (Si/Al ratio: 40) by ion exchange, and then a metallic palladium particle was supported on the zeolite carrier particle by reducing the palladium ion, whereby palladium clusters were supported on the zeolite carrier particle (ion exchange-reduction method). $Pd(NH_3)_4Cl_2 \cdot H_2O$ (tetraamminepalladium(II) chloride monohydrate) was used as a palladium ion source and $NaBH_4$ was used as a reducing agent. The amount of palladium supported was 0.86 mass % relative to the zeolite carrier particle.

<Evaluation: Carbon Monoxide Oxidation Test>

With respect to the supported catalysts of Reference Example 16 and Reference Comparative Example 8, a thermal endurance treatment was performed by subjecting the supported catalyst to heating for 10 hours in an atmosphere at 800° C. containing 20 vol % of oxygen and the balance helium.

A model gas containing 0.3 vol % of carbon monoxide, 8.0 vol % of oxygen and the balance helium was flowed at a spatial velocity of 10,000 $h^{-1}$ over the supported catalysts subjected to the thermal endurance treatment, and the number of molecules of the carbon monoxide molecule capable of being oxidized to carbon dioxide molecule by one palladium atom at a temperature of 100° C. in the temperature dropping process was evaluated by performing a temperature rising process of raising the temperature at a rate of 10° C./min to 800° C. from room temperature and then performing a temperature dropping process of lowering the temperature to room temperature.

The number of molecules can be obtained by dividing the molar number of the carbon dioxide molecule in the model gas flowing per second after reaction by the molar number of palladium as a catalyst metal in the supported catalyst.

Figure 16:
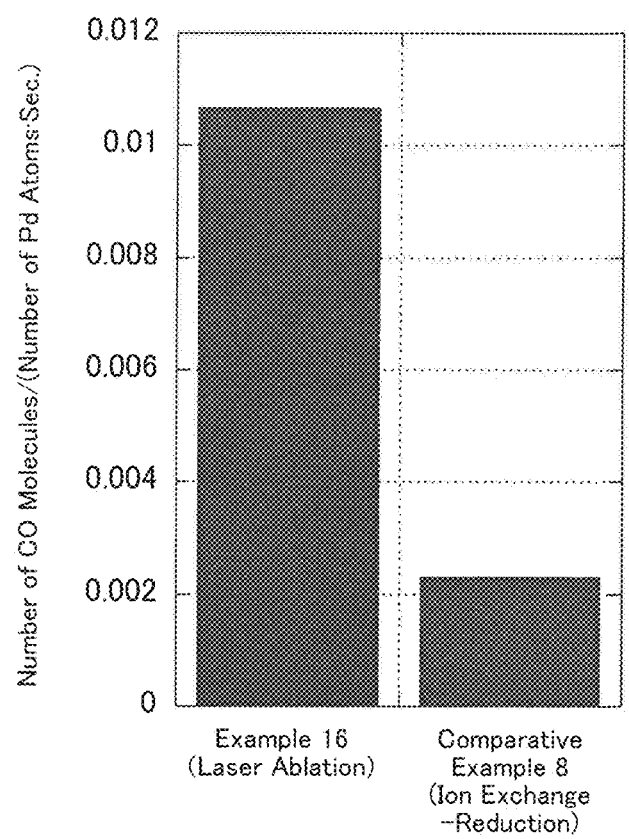
FIG. 16 is a graph illustrating the results of a carbon monoxide oxidation test with respect to the palladium cluster-supporting catalysts of Reference Example 16 prepared by a method of laser ablation in liquid and Reference Comparative Example 8 prepared by an ion exchange-reduction method.

The results as to the supported catalysts of Reference Example 16 and Reference Comparative Example 8 are illustrated in FIG. 16. It is seen from FIG. 16 that in the supported catalyst of Reference Example 16 obtained by the laser ablation method, the number of molecules of the carbon monoxide molecule capable of being oxidized to carbon dioxide molecule by one palladium atom was near 0.008 and on the other hand, in the supported catalyst of Reference Comparative Example 8 obtained by the ion exchange-reduction method, the number did not reach 0.002. This indicates that in the supported catalyst of Reference Comparative Example 8 obtained by the ion exchange-reduction method, the dispersibility of the cluster particle was low and in turn, the heat resistance was poor.

Reference Example 17 and Reference Comparative Example 9

In Reference Example 17 and Reference Comparative Example 9, platinum cluster-supporting catalysts were obtained by using a method of laser ablation in liquid and an ion exchange-reduction method, respectively.

Reference Example 17

In Reference Example 17, platinum clusters were supported on a zeolite carrier particle by a method of laser ablation in liquid in the same manner as in Reference Example 1 except that a platinum target was used in place of the gold target and ZSM-5 zeolite carrier particles (Si/Al ratio: 40) were used as the zeolite carrier particle. The amount of platinum supported was 1.1 mass % relative to the zeolite carrier particle.

Reference Comparative Example 9

In Reference Comparative Example 9, a platinum ion was supported on ZSM-5 zeolite carrier particles (Si/Al ratio: 40) by ion exchange, and then a metallic platinum particle was supported on the zeolite carrier particle by reducing the platinum ion, whereby platinum clusters were supported on the zeolite carrier particle (ion exchange-reduction method). $Pt(NH_3)_4Cl_2 \cdot xH_2O$ (tetraammineplatinum(I) chloride monohydrate) was used as a platinum ion source and $NaBH_4$ was used as a reducing agent. The amount of platinum supported was 1.9 mass % relative to the zeolite carrier particle.

<Evaluation: Carbon Monoxide Oxidation Test>

With respect to the supported catalysts of Reference Example 17 and Reference Comparative Example 9, a thermal endurance treatment was performed by subjecting the supported catalyst to heating for 10 hours in an atmosphere at 800° C. containing 20 vol % of oxygen and the balance helium.

A model gas containing 0.3 vol % of carbon monoxide, 8.0 vol % of oxygen and the balance helium was flowed at a spatial velocity of 10,000 $h^{-1}$ over the supported catalysts subjected to the thermal endurance treatment, and the number of molecules of the carbon monoxide molecule capable of being oxidized to carbon dioxide molecule by one platinum atom at a temperature of 60° C. in the temperature dropping process was evaluated by performing a temperature rising process of raising the temperature at a rate of 10° C./min to 800° C. from room temperature and then performing a temperature dropping process of lowering the temperature to room temperature.

Figure 17:
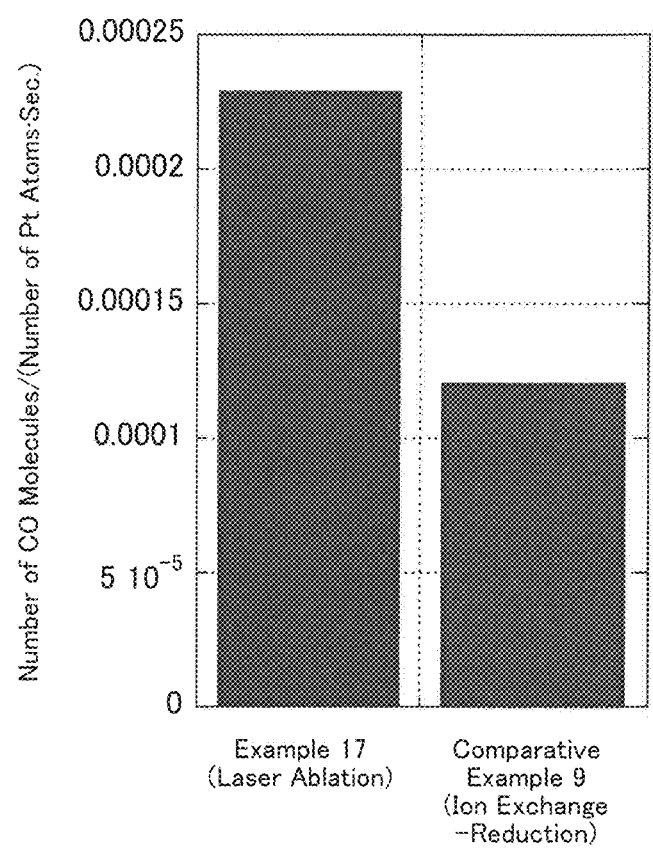
FIG. 17 is a graph illustrating the results of a carbon monoxide oxidation test with respect to the platinum cluster-supporting catalysts of Reference Example 17 prepared by a method of laser ablation in liquid and Reference Comparative Example 9 prepared by an ion exchange-reduction method.

The results as to the supported catalysts of Reference Example 17 and Reference Comparative Example 9 are illustrated in FIG. 17. It is seen from FIG. 17 that in the supported catalyst of Reference Example 17 obtained by the laser ablation method, the number of molecules of the carbon monoxide molecule capable of being oxidized to carbon dioxide molecule by one platinum atom was near 0.0002 and on the other hand, in the supported catalyst of Reference Comparative Example 9 obtained by the ion exchange-reduction method, the number did not reach 0.0001. This indicates that in the supported catalyst of Reference Comparative Example 9 obtained by the ion exchange-reduction method, the dispersibility of the cluster particle was low and in turn, the heat resistance was poor.

Reference Example 18 and Reference Comparative Example 10

In Reference Example 18 and Reference Comparative Example 10, supported copper-cluster catalysts were obtained by using a method of laser ablation in liquid and an ion exchange-reduction method, respectively.

Reference Example 18

In Reference Example 18, copper clusters were supported on a zeolite carrier particle by a method of laser ablation in liquid in the same manner as in Reference Example 1 except that a copper target was used in place of the gold target and a chavazite (CHA)-type zeolite carrier particle were used as the zeolite carrier particle. The amount of copper supported was 0.9 mass % relative to the zeolite carrier particle.

Reference Comparative Example 10

In Reference Comparative Example 10, a copper ion was supported on a chavazite (CHA)-type zeolite carrier particle by ion exchange, and then a metallic copper particle was supported on the zeolite carrier particle by reducing the copper ion, whereby copper clusters were supported on the zeolite carrier particle (ion exchange-reduction method). Copper nitrate was used as a copper ion source and $NaBH_4$ was used as a reducing agent. The amount of copper supported was 0.9 mass % relative to the zeolite carrier particle.

<Evaluation: Nitric Oxide Temperature-Programmed Desorption Test>

With respect to the supported catalysts of Reference Example 18 and Reference Comparative Example 10, nitric oxide was adsorbed to the supported catalyst through heating at 800° C. for 1 hour in an atmosphere containing 10 vol % of oxygen and the balance helium, heating at 800° C. for 30 minutes in an atmosphere containing 100 vol % of helium, lowering of the ambient temperature to 25° C., holding for 1 hour in an atmosphere containing 500 ppm by volume of nitric oxide and the balance helium, and holding for 1 hour in an atmosphere containing 100 vol % of helium.

The supported catalyst having adsorbed thereto nitric oxide was heated at a temperature rise rate of 10° C./min to 800° C. in an atmosphere containing 100 vol % of helium, and the amount of nitric oxide desorbed during the heating was detected by a mass spectrometer to obtain a nitric oxide temperature-programmed desorption spectrum. Incidentally, the gas flow rate in the atmosphere was 10 sccm in all cases.

Figure 18A:
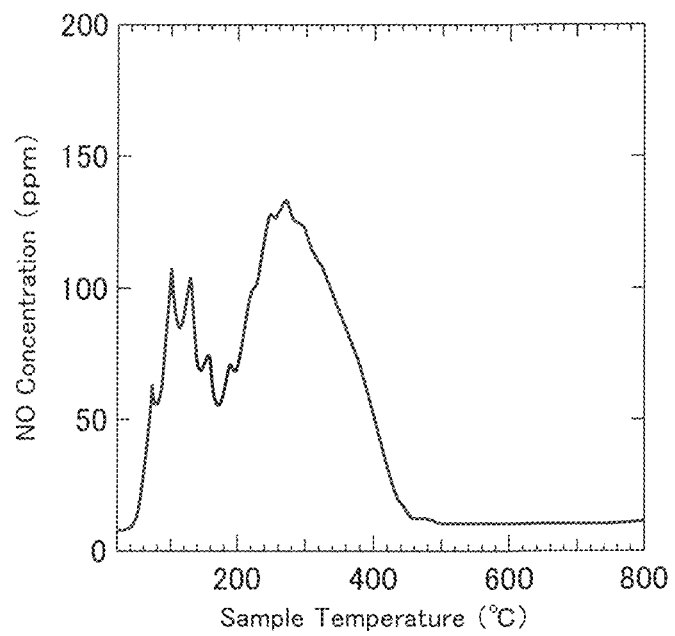
FIGS. 18 A and B are graphs illustrating the results of a nitric oxide temperature-programmed desorption test with respect to the supported copper-cluster catalysts of Reference Example 18 prepared by a method of laser ablation in liquid and Reference Comparative Example 10 prepared by an ion exchange-reduction method.
Figure 18B:
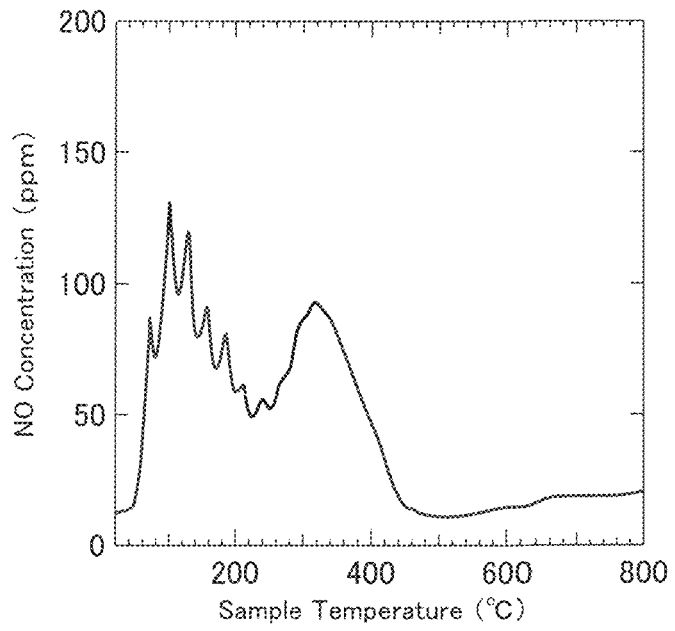

The results as to the supported catalysts of Reference Example 18 and Reference Comparative Example 10 are illustrated in FIGS. 18A and 18B, respectively.

It is revealed from FIG. 18A that in the supported catalyst of Reference Example 18 obtained by the laser ablation method, the maximum peak in the range of 200 to 400° C. is present at about 270° C. On the other hand, it is revealed from FIG. 18B that in the supported catalyst of Reference Comparative Example 10 obtained by the ion exchange-reduction method, the maximum peak in the range of 200 to 400° C. is present at about 320° C. A sharp peak observed at a temperature of about 200° C. or less is thought of as a measurement error due to fluctuation of the measurement temperature.

The difference in the temperature between maximum peaks illustrated in FIGS. 18A and 17B indicates that the supported catalyst of Reference Example 18 obtained by the laser ablation method and the supported catalyst of Reference Comparative Example 10 obtained by the ion exchange-reduction method have different structures from each other.

Reference Example 19 and Reference Comparative Example 11

In Reference Example 19 and Reference Comparative Example 11, platinum cluster-supporting catalysts were obtained by using an positive-negative inversion method and an ion exchange-reduction method, respectively.

Reference Example 19

In Reference Example 19, zeolite MFI(40) was added to 200 ml of an aqueous solution containing 10 mM of $H_2[PtCl_6]$ in pure water, a pulsed laser is converged and introduced into this aqueous solution to decompose $H_2[PtCl_6]$ and produce a positively charged platinum cluster, and the positively charged platinum clusters were supported on the acid sites of zeolite through an electrostatic interaction.

Reference Comparative Example 11

In Reference Comparative Example 11, $H_2[PtCl_6]$ in pure water was supported on zeolite MFI(40) by ion exchange. The amount of platinum supported was 0.003 mass % relative to the zeolite carrier particle.

<Evaluation: Fluorescence Spectrum>

Figure 19:
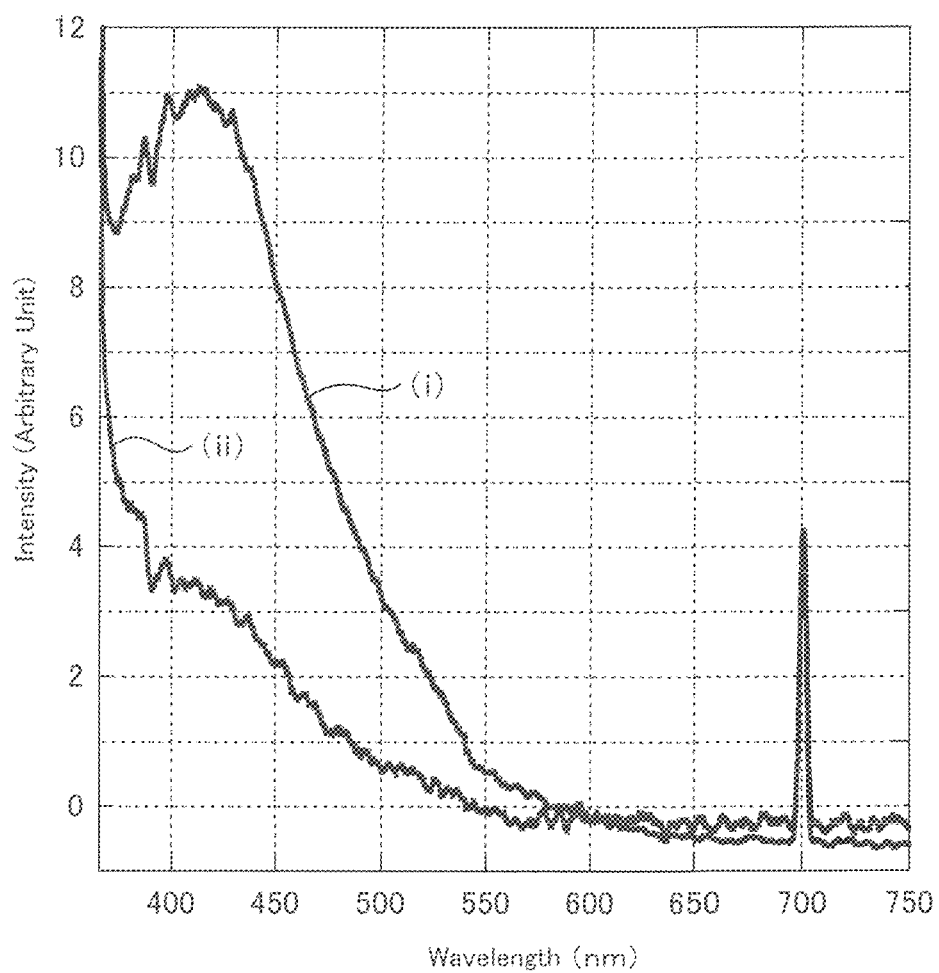
FIG. 19 is a graph illustrating the fluorescence spectra with respect to the platinum cluster-supporting catalysts of Reference Example 19 prepared by a positive-negative inversion method and Reference Comparative Example 11 prepared by an ion exchange-reduction method.

The platinum cluster-supporting catalysts of Reference Example 19 and Reference Comparative Example 11 were measured for the fluorescence spectrum (excitation wavelength: 350 nm). The evaluation results of fluorescence spectrum are illustrated in FIG. 19. In FIG. 19, the results as to Reference Example 18 is indicated by the spectrum (i), and the result as to Reference Comparative Example 11 is indicated by the spectrum (ii).

In FIG. 19, the fluorescence signal at near 410 nm is a spectrum in which fluorescent emissions from the gold cluster of about tetramer were overlapped. Accordingly, FIG. 19 reveals that in the platinum cluster-supporting catalyst of Reference Example 18, a relatively large amount of a platinum cluster around tetramer is supported on the carrier particle and on the other hand, in the supported-platinum catalyst of Reference Comparative Example 11, such clusters are not present in a significant manner.

Reference Example 20 and Reference Comparative Example 12

In Reference Example 20 and Reference Comparative Example 12, rhodium cluster-supporting catalysts were obtained by using a method of laser ablation in liquid and an ion exchange-reduction method, respectively.

Reference Example 20

In Reference Example 20, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Reference Comparative Example 12

In Reference Comparative Example 12, a rhodium ion was supported on ZSM-5 zeolite carrier particles (Si/Al ratio: 40) by ion exchange, and then rhodium clusters were supported on the zeolite carrier particle by reducing the rhodium ion. $Rh(NO_3)_3$ was used as a rhodium ion source and $NaBH_4$ was used as a reducing agent. The amount of rhodium supported was 0.051 mass % relative to the zeolite carrier particle.

<Evaluation: Nitric Oxide Reduction Test>

A thermal endurance treatment was performed by heating the supported catalyst for 1 hour in an atmosphere at 800° C. containing 8 vol % of oxygen, 0.3 vol % of carbon monoxide and the balance helium.

A model gas containing 0.1 vol % of $^{15}NO$, 0.65 vol % of CO and the balance helium was flowed at a spatial velocity of 10,000 $h^{-1}$ over the supported catalysts subjected to the thermal endurance treatment, and the nitric oxide reduction reaction was measured by raising the temperature at a rate of 10° C./min to 800° C. from room temperature (temperature rising process) and then lowering the temperature to room temperature (temperature dropping process).

Figure 20A:
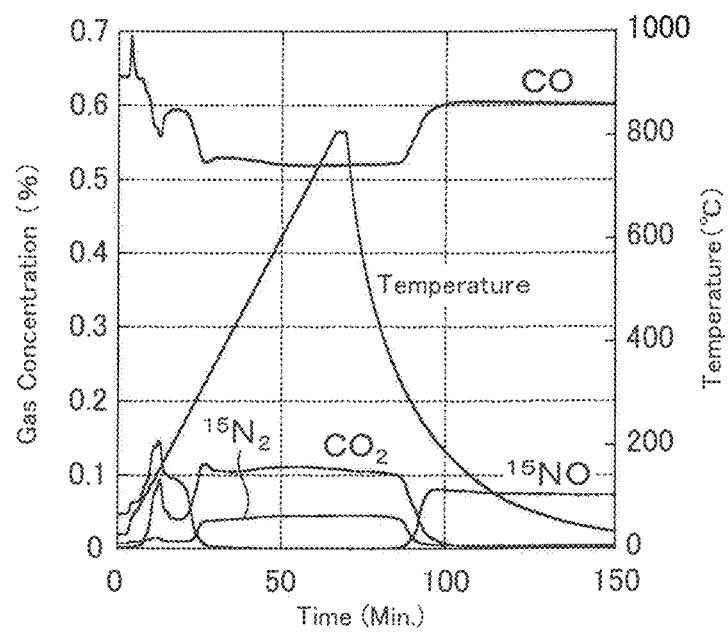
FIGS. 20 A and B are graphs illustrating the nitric oxide reduction test results (gas composition) with respect to the rhodium cluster-supporting catalysts of Reference Example 20 prepared by a method of laser ablation in liquid and Reference Comparative Example 12 prepared by an ion exchange-reduction method.
Figure 20B:
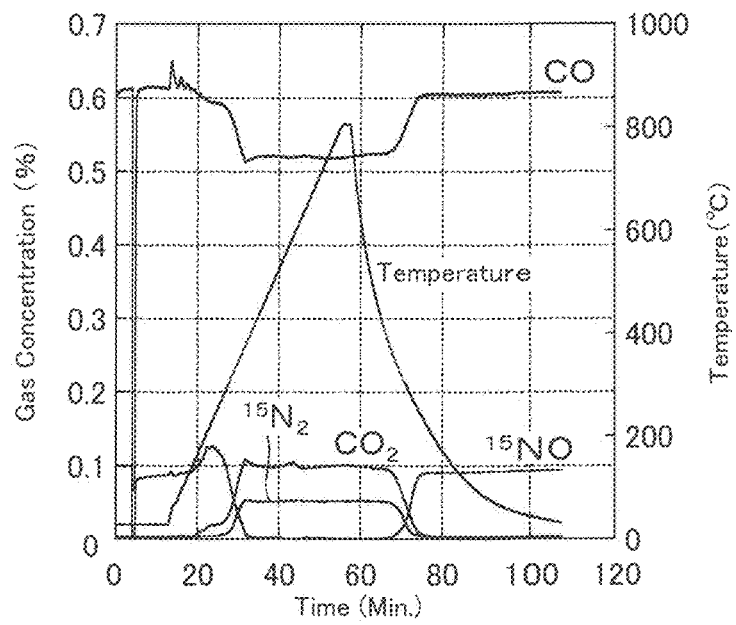

With respect to the concentration change of each component due to the nitric oxide reduction, the evaluation result as to the catalyst of Reference Example 20 is illustrated in FIG. 20A, and the evaluation result as to the catalyst of Reference Comparative Example 12 is illustrated in FIG. 20B.

In FIGS. 20A and 20B, a peak of nitrogen oxide appears in the range of 100 to 200° C., and this is a concentration rise due to desorption of nitric oxide adsorbed to the catalyst. When the reaction temperature further rises, the concentration of nitric oxide decreases, and a reaction of reducing nitric oxide ($^{15}NO$) by carbon monoxide (CO) to produce nitrogen ($N_2$) starts.

In the catalyst of Reference Example 20, the reaction temperature at the time of half of the nitric oxide supplied being reduced into nitrogen, i.e., the reaction temperature at the time of the nitrogen concentration becoming 0.05 vol %, is about 272° C. in the temperature rising process and 254° C. in the temperature dropping process, whereas in the catalyst of Reference Comparative Example 12, the reaction temperature was about 321° C. in the temperature rising process and 279° C. in the temperature dropping process. It is therefore revealed that the catalyst of Reference Example 20 obtained by the method of laser ablation in liquid has excellent low-temperature activity, compared with the catalyst of Reference Comparative Example 12 obtained by the ion exchange-reduction method.

Figure 21:
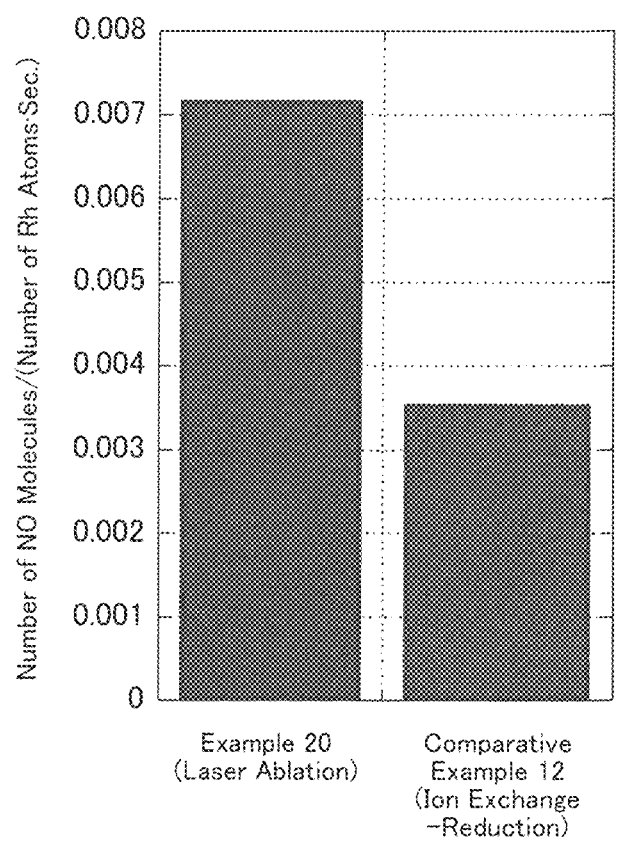
FIG. 21 is a graph illustrating the nitric oxide reduction test results with respect to the rhodium cluster-supporting catalysts of Reference Example 20 prepared by a method of laser ablation in liquid and Reference Comparative Example 12 prepared by an ion exchange-reduction method.

The evaluation results of the number of molecules of the nitric oxide molecule capable of being reduced to nitrogen by one rhodium atom at a temperature of 250° C. in the temperature dropping process are illustrated in FIG. 21.

FIG. 21 reveals that in the supported catalyst of Reference Example 20 obtained by the laser ablation method, the number of molecules of nitrogen monoxide molecule capable of being purified in 1 second by one rhodium atom exceeded 0.007 and on the other hand, in the catalyst of Reference Comparative Example 12 obtained by the ion exchange-reduction method, the number did not reach 0.004. It is therefore apparent that the catalyst of Reference Example 20 obtained by the laser ablation method has excellent low-temperature activity, compared with the catalyst of Reference Comparative Example 12 obtained by the ion exchange-reduction method.

Reference Examples 21 and 22 and Reference Comparative Example 13

In Reference Examples 21 and 22, a platinum cluster-supporting catalyst and a rhodium cluster-supporting catalyst were obtained respectively by using a method of laser ablation in liquid. In Reference Comparative Example 13, a general three-way catalyst in which platinum, rhodium and palladium are supported on a mixed powder of alumina carrier particles and ceria-zirconia carrier particles was used.

Reference Example 21

In Reference Example 21, platinum clusters were supported on a zeolite carrier particle by a method of laser ablation in liquid in the same manner as in Reference Example 1 except that a platinum target was used in place of the gold target and ZSM-5 zeolite carrier particles (Si/Al ratio: 40) were used as the zeolite carrier particle. The amount of platinum supported was 0.59 mass % relative to the zeolite carrier particle.

Reference Example 22

In Reference Example 22, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Reference Comparative Example 13

In Reference Comparative Example 13, a general three-way catalyst in which platinum, rhodium and palladium are supported on a mixed powder of alumina carrier particles and ceria-zirconia carrier particles was used. The amounts of platinum, rhodium and palladium supported were 0.2 mass %, 0.19 mass % and 0.25 mass %, respectively, relative to the carrier powder.

<Evaluation: Oxygen Oxidation Reaction Test of Adsorbed Carbon Monoxide>

The catalysts of Reference Examples 21 and 22 and Reference Comparative Example 13 were held at 800° C. for 1 hour in an atmosphere containing 500 ppm by volume of carbon monoxide and the balance helium to adsorb carbon monoxide to the supported catalyst, and then an oxygen oxidation reaction test of adsorbed carbon monoxide was performed by heating the supported catalyst having adsorbed thereto carbon monoxide at a temperature rise rate of 10° C./min to 800° C. in an atmosphere containing 10 vol % of oxygen and the balance helium.

During these treatments, the spatial velocity was 10,000 $h^1$.

In addition, the catalysts of Reference Examples 21 and 22 and Reference Comparative Example 13 were cleaned by performing the following treatments (i) to (iv):

(i) putting the catalyst at a concentration of 4 mass % in an aqueous 1 M sodium chloride solution, followed by stirring at 80° C. for 10 days, (ii) after (i) above, rinsing the catalyst with ion-exchanged water, (iii) after (ii) above, putting the catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water.

The catalysts of Reference Examples 21 and 22 and Reference Comparative Example 13 subjected to the cleaning treatment were subjected to the above-described oxygen oxidation reaction test of adsorbed carbon monoxide.

Figure 22:
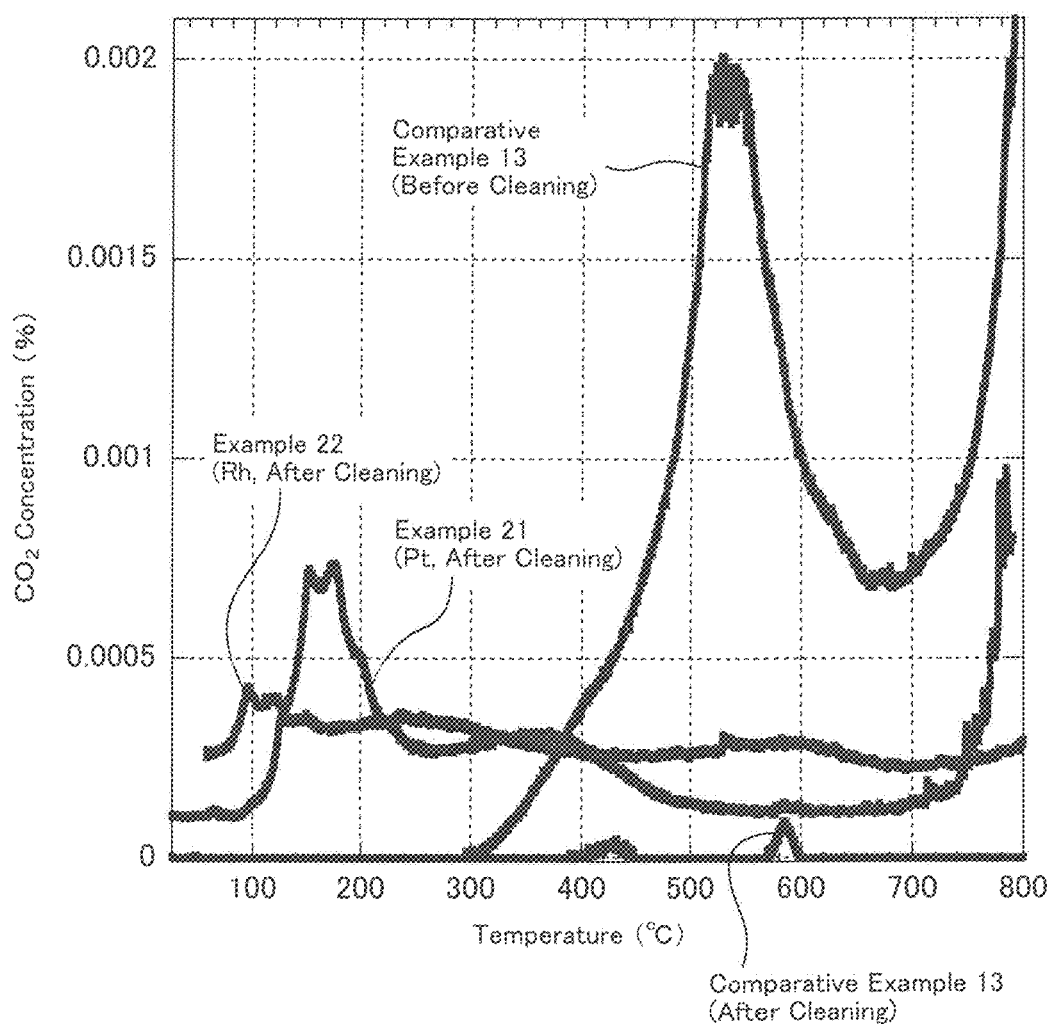
FIG. 22 is a graph illustrating the results of an oxygen oxidation reaction test of adsorbed carbon monoxide after cleaning treatment with respect to the platinum cluster-supporting catalyst of Reference Example 21 prepared by a method of laser ablation in liquid and the rhodium cluster-supporting catalysts of Reference Example 22 prepared by a method of laser ablation in liquid, and the results of an oxygen oxidation reaction test of adsorbed carbon monoxide before and after cleaning treatment with respect to a general three-way catalyst.

With respect to the catalysts of Reference Examples 21 and 22 and Reference Comparative Example 13, the results of the oxygen oxidation reaction test of adsorbed carbon monoxide before and after the cleaning treatment are illustrated in FIG. 22.

As apparent from FIG. 22, in the catalysts of Reference Examples 21 and 22 obtained by the method of laser ablation in liquid, a signal on the low temperature side of 200° C. or less was present after the cleaning treatment, whereas in the catalyst of Reference Comparative Example 13 that is a general three-way catalyst, the difference in the evaluation result between before and after the cleaning treatment was large and a signal on the low temperature side of 200° C. or less was not observed.

This is considered to be attributable to the fact that in the catalysts of Reference Examples 21 and 22 obtained by the method of laser ablation in liquid, the catalyst metal clusters was supported within the pores of zeolite and the catalyst metal clusters was thereby not lost even by cleaning, whereas in the general three-way catalyst, the catalyst metal particles were supported on the outer surface of the carrier particle and consequently, the catalyst metal particles were lost by cleaning.

DESCRIPTION OF NUMERICAL REFERENCES

11 Acetone as dispersion medium
12 Plate of gold
13 Vessel
14 Lens
15 Laser
16 Gold cluster
20 Zeolite carrier particle

The invention claimed is:

1. A cluster-supporting catalyst, comprising heteroatom-removed zeolite particles, and catalyst metal clusters supported within the pores of the heteroatom-removed zeolite particles, wherein the catalyst metal clusters have a positive charge, and are supported on acid sites within the pores of the heteroatom-removed zeolite particles through an electrostatic interaction.

2. The cluster-supporting catalyst according to claim 1, wherein the heteroatom-removed zeolite particles are aluminum-removed zeolite particles.

3. The cluster-supporting catalyst according to claim 1, wherein the catalyst metal clusters are selected from the group consisting of clusters of platinum, palladium, rhodium, iridium, ruthenium, silver, titanium, vanadium, chromium, manganese, iron, cobalt, nickel, copper, zinc, molybdenum, tungsten, rhenium, silicon and germanium, and a combinations thereof.

4. The cluster-supporting catalyst according to claim 3, wherein the catalyst metal clusters are selected from the group consisting of clusters of copper and iron, and a combinations thereof.

5. An exhaust gas purification method, wherein an exhaust gas is purified by the cluster-supporting catalyst according to claim 1.

6. A liquid-phase synthesis reaction method, gas-phase synthesis reaction method, fuel cell reaction method, or air cell reaction method, wherein a liquid-phase synthesis reaction, gas-phase synthesis reaction, fuel cell reaction, or air cell reaction is catalyzed by the cluster-supporting catalyst according to claim 1.

7. A catalyst device, comprising the cluster-supporting catalyst according to claim 1, and a substrate supporting the catalyst.

8. A method for producing the cluster-supporting catalyst according to claim 1,
   wherein the cluster-supporting catalyst comprises heteroatom-removed zeolite particles, and catalyst metal clusters supported within the pores of the heteroatom-removed zeolite particles; and wherein the method comprises the followings steps:
providing a dispersion liquid containing a dispersion medium and the heteroatom-removed zeolite particles dispersed in the dispersion medium, and
forming, in the dispersion liquid, catalyst metal clusters having a positive charge, and supporting the catalyst metal clusters within the pores of the heteroatom-removed zeolite particles through an electrostatic interaction.

9. The method according to claim 8, wherein the dispersion liquid is provided by pulverizing the heteroatom-removed zeolite particles, and dispersing the pulverized heteroatom-removed zeolite particles in the dispersion medium.

10. The method according to claim 8, wherein the clusters are formed in the dispersion liquid by any of the following methods:
a method of laser ablation in liquid,
a method of microwave ablation in liquid,
a method of plasma ablation in liquid,
a positive-negative inversion method, and
a method of reduction in liquid.

11. The method according to claim 10, wherein metal ions constituting the catalyst metal clusters are reduced by a reducing agent through the method of reduction in liquid to form the cluster in the dispersion liquid, and the dispersion liquid is irradiated with plasma and/or microwave to promote the reduction by the reducing agent.

12. The method according to claim 8, wherein the dispersion medium of the dispersion liquid is an organic solvent.

13. The cluster-supporting catalyst according to claim 1, wherein the catalyst metal clusters comprise 4 or more metal atoms.

14. The cluster-supporting catalyst according to claim 1, wherein the catalyst metal clusters have a particle diameter of 1 nm or less.

* * * * *